US007625090B2

(12) United States Patent
Brown et al.

(10) Patent No.: US 7,625,090 B2
(45) Date of Patent: Dec. 1, 2009

(54) FOLDING AND ADJUSTING HINGE FOR STABILIZED EQUIPMENT SUPPORT

(75) Inventors: Garrett W. Brown, 515 Addison Ct., Philadelphia, PA (US) 19147; Anthony D. Sacksteder, Philadelphia, PA (US)

(73) Assignee: Garrett W. Brown, Philadelphia, PA (US)

( * ) Notice: Subject to any disclaimer, the term of this patent is extended or adjusted under 35 U.S.C. 154(b) by 630 days.

(21) Appl. No.: 11/403,500

(22) Filed: Apr. 13, 2006

(65) Prior Publication Data
US 2006/0262274 A1 Nov. 23, 2006

Related U.S. Application Data

(60) Provisional application No. 60/672,138, filed on Apr. 15, 2005.

(51) Int. Cl.
G03B 17/00 (2006.01)
(52) U.S. Cl. .................. 352/243; 248/187.1; 396/428
(58) Field of Classification Search ........ 352/243; 248/178.1, 187.1; 227/908; 396/419, 428, 396/422
See application file for complete search history.

(56) References Cited

U.S. PATENT DOCUMENTS

| 3,105,430 | A | 10/1963 | Femelius |
| 3,266,403 | A | 8/1966 | Anderson |
| 4,017,168 | A | 4/1977 | Brown |
| 4,030,114 | A | 6/1977 | Telfer |
| 4,083,480 | A * | 4/1978 | Lee et al. ............... 224/185 |
| 4,158,489 | A | 6/1979 | Gottschalk et al. |
| 4,177,967 | A | 12/1979 | Marchus |
| 4,244,500 | A | 1/1981 | Fournier |
| 4,437,753 | A | 3/1984 | Dunn |
| 4,474,439 | A | 10/1984 | Brown |
| 4,545,660 | A | 10/1985 | Rudolf |
| RE32,213 | E | 7/1986 | Brown |
| 4,600,357 | A | 7/1986 | Coules |
| 4,640,481 | A | 2/1987 | Kohno |
| 4,672,436 | A | 6/1987 | Hawthorne |
| 4,752,794 | A | 6/1988 | Bohannon |
| 4,943,820 | A * | 7/1990 | Larock ............... 396/423 |
| 4,946,272 | A * | 8/1990 | Brown ............... 352/243 |
| 5,098,182 | A | 3/1992 | Brown |
| 5,229,798 | A | 7/1993 | Brown |

OTHER PUBLICATIONS

Written Opinion of the International Search Authority for PCT Patent Application No. PCT/US06/13821, dated May 9, 2007.
Notification of First Office Action for Chinese Patent Application No. 200680012029.5, issued Mar. 13, 2009.
PCT International Search Report for PCT Patent Application No. PCT/US06/13821, dated Aug. 15, 2007.

* cited by examiner

Primary Examiner—William C Dowling
(74) Attorney, Agent, or Firm—Schnader Harrison Segal & Lewis LLP

(57) ABSTRACT

An improved equipment stabilizing support apparatus having an upper spar associated with the equipment and a lower spar connected by a double-acting type hinge that provides angular displacement between the upper and lower spars to adjustably balance equipment, and angular displacement around a second axis to allow folding of the lower spar toward the upper spar to an optimum closed configuration regardless of the adjusted balancing position.

20 Claims, 23 Drawing Sheets

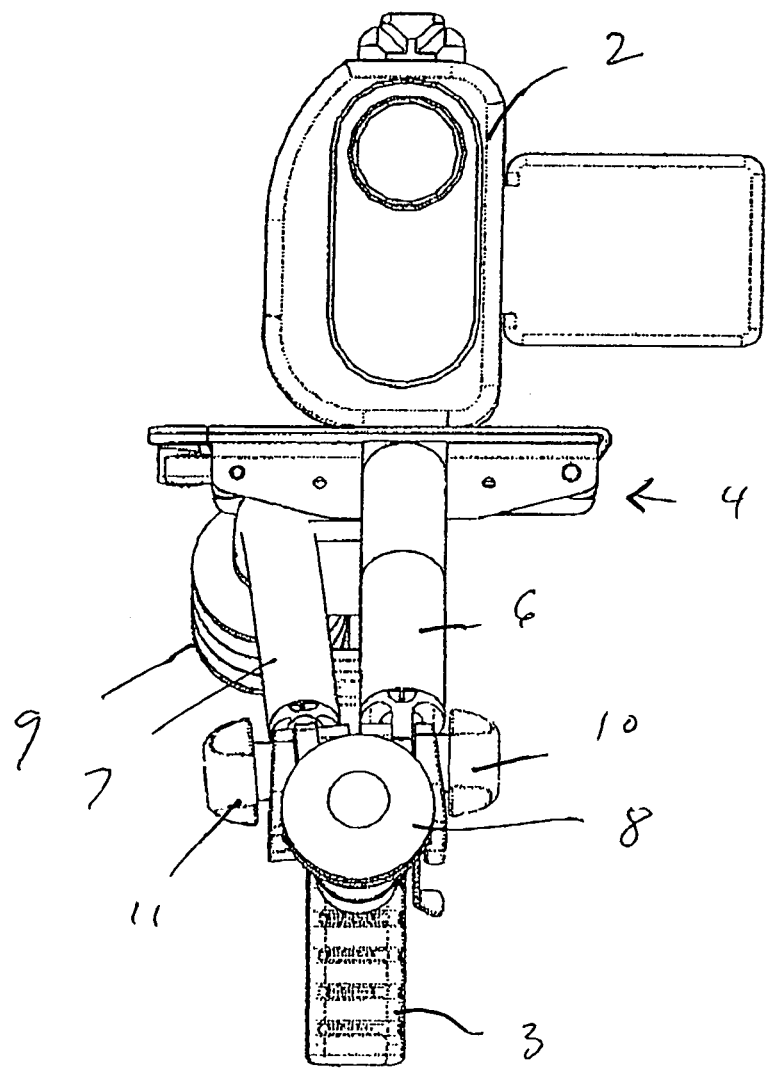
FIG. 11

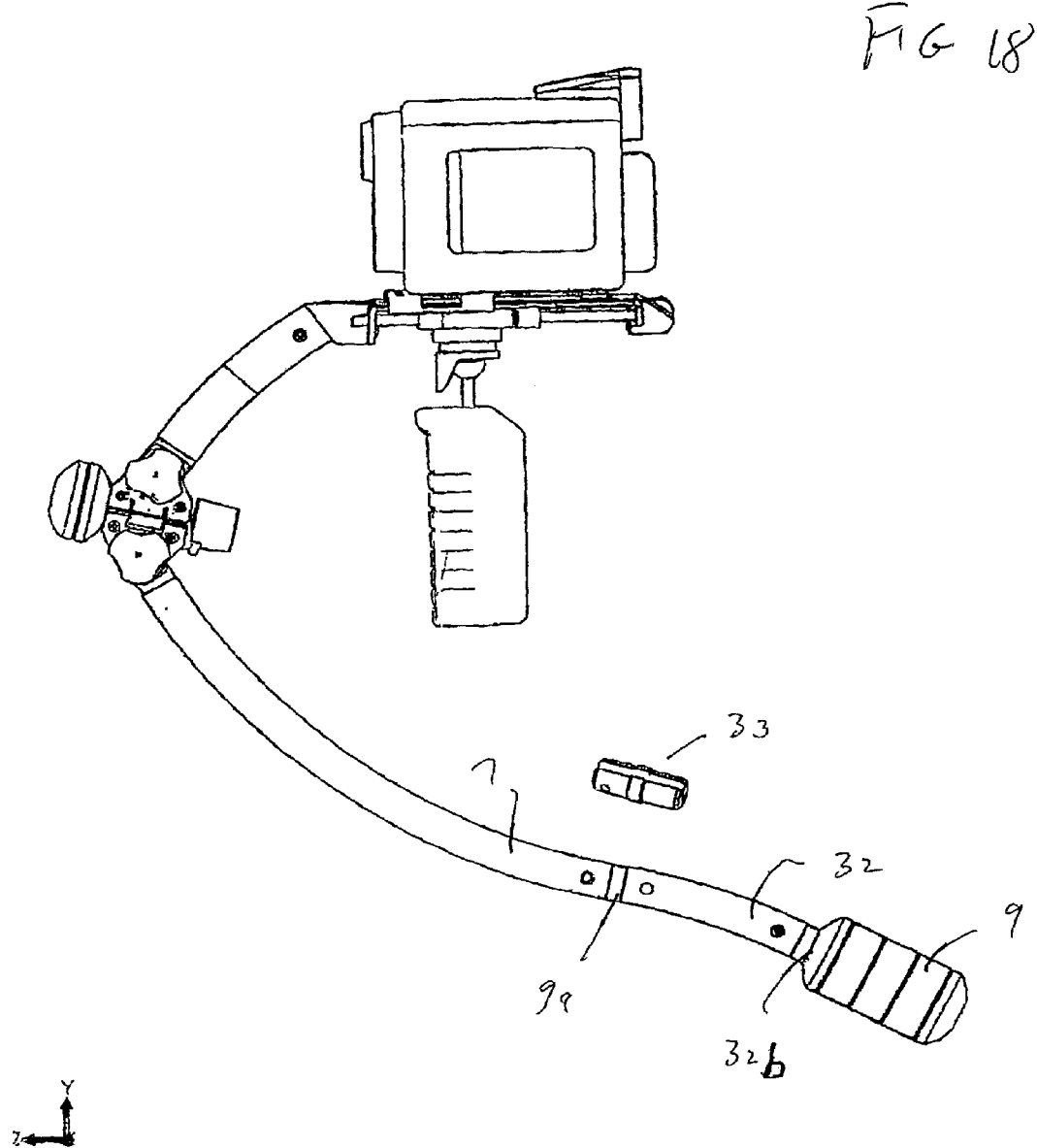

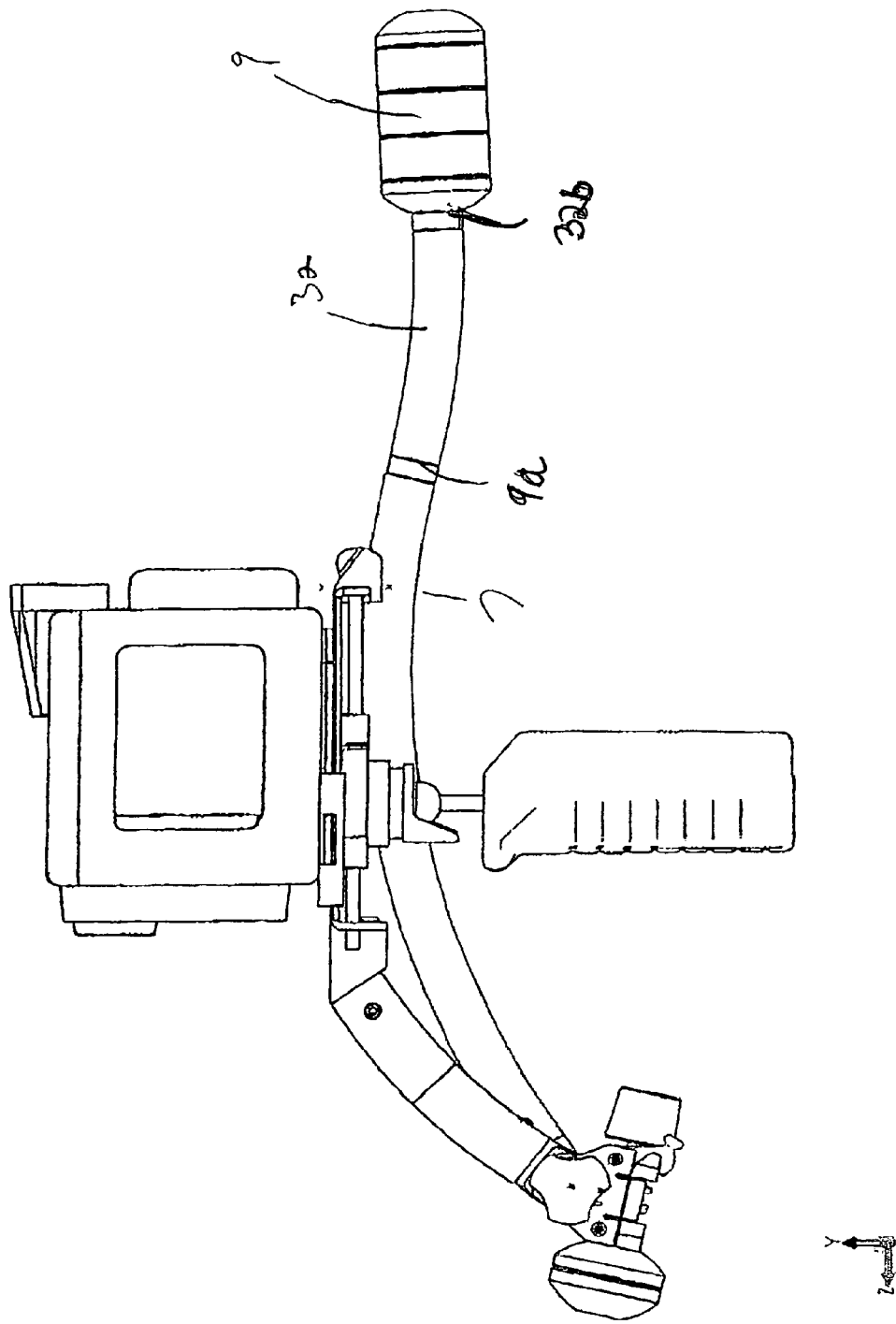

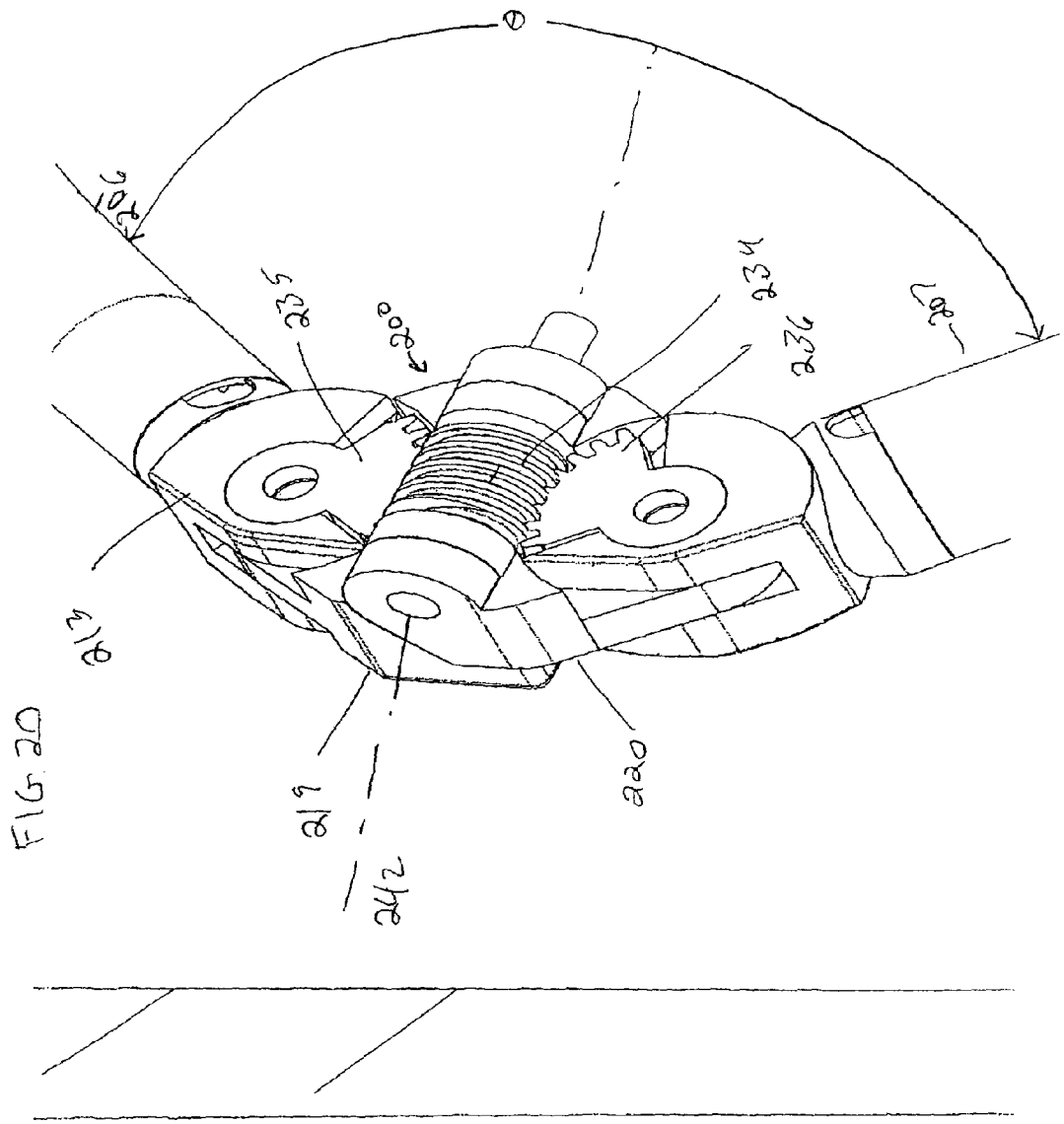

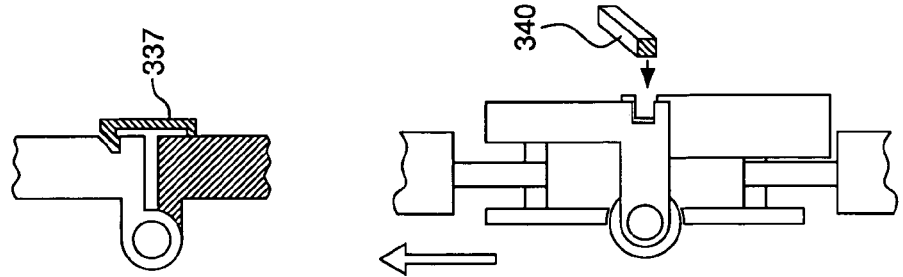
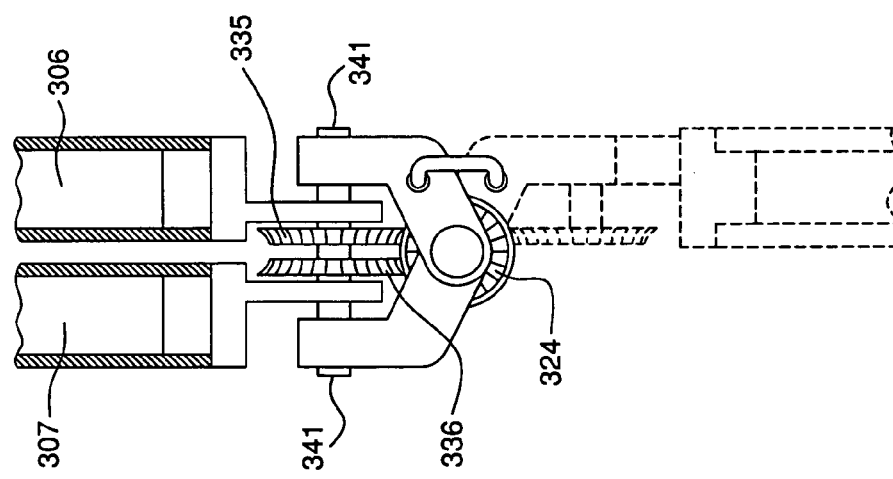
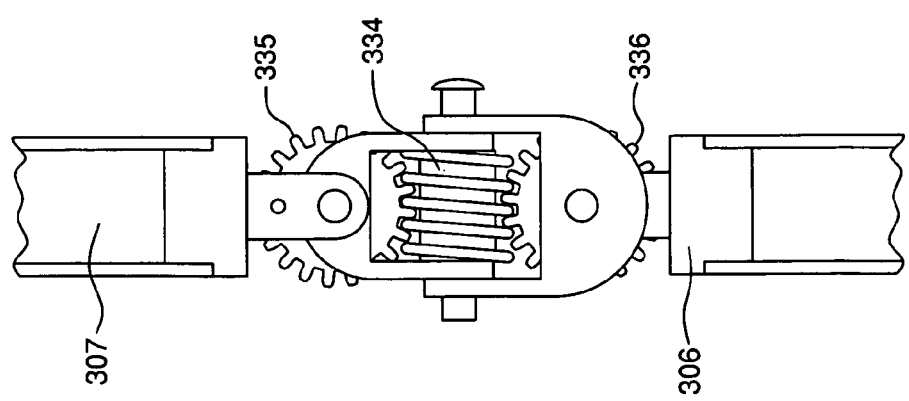

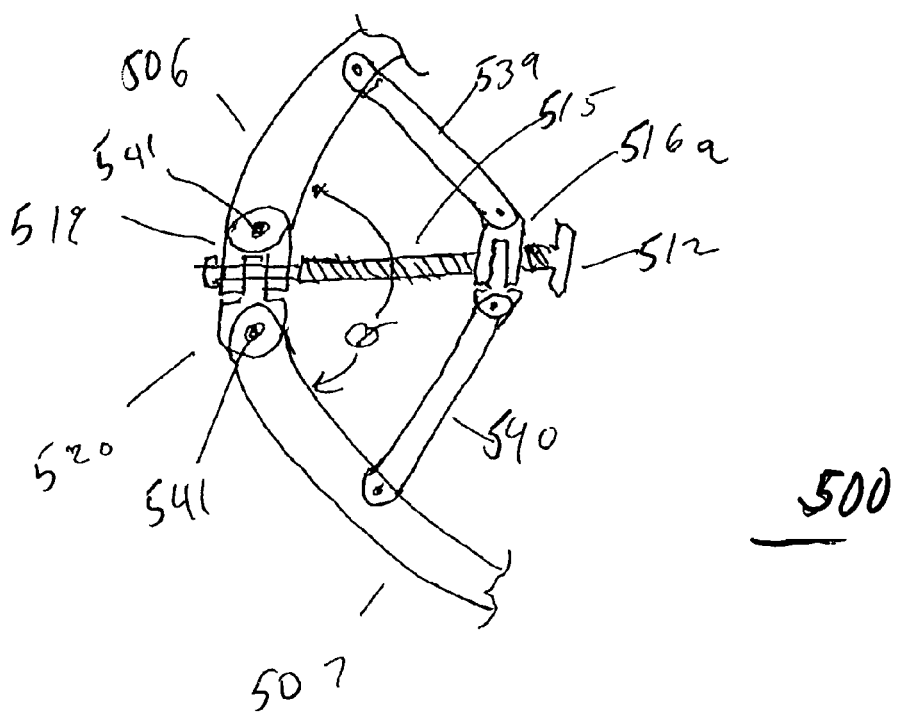

FOLDING AND ADJUSTING HINGE FOR STABILIZED EQUIPMENT SUPPORT

This application is based on, and claims priority to, provisional application Ser. No. 60/672,138, having a filing date of Apr. 15, 2005, and entitled, Folding and Adjusting Hinge for Stabilized Equipment Support.

FIELD OF THE INVENTION

The invention is directed to stabilized equipment supports, and more particularly to hinges for supports.

BACKGROUND OF THE INVENTION

This invention relates generally to equipment supports, and more particularly to an improvement in portable handheld equipment adapted to stabilize compact video camcorders.

Mobile film or video cameras typically require angular and spatial stability in order to obtain smooth, high-quality results. The Steadicam® portable camera stabilizing device, which has become a de facto standard in the TV and movie industry, was developed to permit stable ambulatory videography or cinematography by an operator. The inventor's U.S. Pat. No. 4,017,168 (Re. 32,213) is directed to a version of the Steadicam® technology. Following the advent of lightweight video camcorders, an inexpensive, lightweight stabilizer was needed in order to deliver the same high-quality mobile, ambulatory moving-picture images provided by the full-sized Steadicam®.

The inventor's U.S. Pat. Nos. 4,946,272, 5,098,182 and 5,229,798 describe compact stabilized equipment supports for hand-held camcorders that function without the need for the articulated, spring-powered exo-skeletal support arms essential to the operation of the full-sized Steadicam with big professional film and video cameras. The inventor's prior art invention comprises an expanded, counterbalanced, lightweight camera-mounting-and stabilizing assembly, which is hand-supported by means of a novel 'interrupted handle' in which the 'gripping' portion is connected through an angle-isolating gimbal to a guiding surface attached to the underside of the camera. A molded plastic version of the device, which was marketed as the 'Steadicam JR™, inaugurated, and likewise became the de facto standard of, the category of hand-held camcorder stabilizers. That plastic version, however, was inherently somewhat less rigid, and therefore was less precisely and consistently balanced, than the original aluminum prototype as detailed in the above-mentioned U.S. Pat. No. 4,946,272. Such flexibility is deleterious to camera stability and tends to limit the focal lengths of the lenses that can be employed, since the energy of any vibration within or between components is conserved in the entire assembly and produces sympathetic vibrations that may be apparent in the camera's images, particularly as the lens is 'zoomed in' toward the telephoto end of its range.

The plastic Steadicam JR™ could be folded into a compact form for storage and for 'shoulder use', but when unfolded for use, though the 'interrupted handle' provided for fine adjustment of bottom heaviness. Gross vertical balancing of the plastic Steadicam JR™ for cameras of various weights was incrementally accomplished by interchanging a series of hinge stops of different thicknesses, and by adding and subtracting weights at the lower extremities. Neither the Plastic 'JR' nor the original aluminum prototype provided for precise, repeatable vernier adjustment of gross vertical balance.

Though rigid, the aluminum prototype, was not adapted to be conveniently (or repeatably) folded. Unlocking its hinge to raise the lower spar up beneath the camera mounting platform caused its balance position (achieved by trial and error) to be lost.

FIG. 1 generally illustrates a stabilized equipment support 101 of the prior art, for use in connection with a camera 102 which, in the embodiment illustrated, corresponds to a "compact" video camera ("CamCorder") of the type which is conventionally available to the consumer. It will be understood that the camera 102 has been selected only for purposes of illustration, and that any of a number of camera configurations other than that shown in the drawings, as well as other types of "equipment" to be supported, may be used with the stabilized support 110, which is illustrated.

The stabilized camera support 101 includes a platform 103 for receiving the camera 102, and for receiving the handle 105. A first strut 106 extends from forward portions 107 of the platform 103 to a mounting 108 for receiving a view finding device 110. As with the camera 102, it is to be understood that the view finding device 110, which is shown in the drawings has been selected only for purposes of illustration, and that any of a number of available view finding devices may be used in connection with the stabilized camera support 101 of the present invention. Further extending from the mounting 108 is a second strut 111, which extends to a holder 112 for receiving one or more batteries 113 for providing the power needed to operate the camera 102.

It is to be noted here that the various components of the stabilized support 101 have been carefully located to provide an expanded, balanced camera-equipment-receiving structure having a mass (including all structures), which is disposed along at least two perpendicular axes (either as a plurality of discrete components or as a single longitudinally disposed mass) in a fashion which increases the rotational inertia of the unit, and which provides access to its center of gravity, to permit an adjustment of the relationship between the handle 105 of the stabilized camera support 110 and the center of gravity of the resulting unit, and thus provide a stabilized mounting for isolating the camera 102 from the broad spectrum of unwanted high-to-low frequency angular motions that may be encountered. This is accomplished irrespective of the particular mass or masses that are to comprise the stabilized camera support 110, as well as the configuration for the camera 102 and the view finding device 110, in a light and rigid interconnecting structure which permits access to the center of gravity of the resulting unit to achieve the desired stabilizing effect.

The handle 105 is generally comprised of two discrete, isolated handle portions. One portion of the handle 105 is constituted by the threaded end 137 which is received by the bushing 135 of the x-y table 120, and includes a control surface 140 which is adapted to be grasped by the operator, preferably using the thumb and index finger, for use in orienting the stabilized camera support 101. The other portion of the handle 5 is constituted by a grip 141 having notches 142 for receiving the remaining fingers of the operator's hand, to provide primary support for the stabilized camera support 101.

Any of a variety of devices may be used to connect the grip 141 and the end 137 of the handle 105, provided the selected mechanism is capable of isolating angular movements. The device selected for illustration in the drawings is a gimbal 145, although other types of isolating mechanism (e.g. ball and socket arrangements) can also be used for this purpose. The gimbal 145 is configured to provide angular isolation in three mutually perpendicular directions, and is specially configured to be sufficiently small to fit between the grip 141 and end 137 of the handle 135 so as to poise the 'head' of the stabilized camera support 101 upon a gimbal, which is sufficiently small to avoid interference with the use of the device by the operator. Thus, the gimbal 145 is sufficiently small to fit within the confines of the end 137 of the handle 105, in essence developing what can be considered to be a split or interrupted handle comprised of the handle portion 137, 141 and the gimbal 145.

This 'interrupted handle' operates to effectively separate the functions of lifting and orienting the stabilized camera support 101 and camera 102, even when held by only a single hand. The unit is easily supported by grasping the lower section or grip 141 of the handle 105 with the middle, ring and little fingers of the hand, providing adequate support for the unit, and facilitating transport of the assembly.

To be noted is that the lower section remains in angular isolation from the upper end 137 of the handle 105, so that the supported equipment remains virtually isolated from unwanted angular movements of the operator in the course of these support functions.

The end 137 of the handle 105 incorporates a relatively small, yet conveniently placed control surface 140 which can be lightly grasped by the thumb and index finger of the same hand (or of the other hand if desired), and preferably surrounds approximately the upper 50% of the gimbal 145, in annular fashion. This operates to avoid interference between the gimbal 145 and the remainder of the handle 105, as well as with the hands of the operator, and develops a limited (minimal) control surface, which can be lightly grasped to orient the stabilized camera support 101, and accordingly the camera 102, in the course of its operation.

Thus, these various approaches, and other variously simplistic attempts at hand-held camcorder stabilizers, have failed to provide an apparatus which could conveniently, repeatably and progressively be adjusted to stabilize a range of camcorders of various weights, and which could also fold and unfold in a manner that alternately sought either the singular best folding position or the elected, balanced operating position for the chosen camcorder and its associated equipment. Therefore, there is a need for a stabilized equipment support for lightweight camcorders that is particularly well adapted for repeatable adjustment of vertical balance and consistent folded positioning for shoulder deployment and storage purposes.

SUMMARY OF THE INVENTION

Embodiments of the present invention are directed to stabilized hand-held supports for equipment such as lightweight video cameras, and are more particularly directed toward an improved apparatus for both adjustment of balance and consistent folding. Embodiments of the invention can be used for various types of equipment, but are particularly applicable to hand-held cameras, so will primarily be discussed in that application.

In an exemplary embodiment of the invention, the apparatus comprises a double-acting, vernier-adjustable hinge apparatus that combines an adjustment for balancing the apparatus with a hinge for folding it. The double-acting hinge connects an upper spar with a lower spar of a handheld stabilizing camcorder support, where the spars and/or hinges, or components thereto, are also used to counterbalance the camcorder. Upper and lower hinge bodies are rotatably connected along a folding axis. Furthermore, the spars pivot about balancing axes. The upper hinge body is pivotally associated with the upper spar, and the lower hinge body is pivotally associated with the lower spar for counterbalancing the camcorder. Weight(s) can be provided on the support apparatus to counterbalance various camera weight. Adjustment of the respective pivot angles of the upper and lower spars can be accomplished by mechanisms such as, worm wheels connected to the pivots driven about the balancing axes by a worm wheel disposed along the fore/aft hinge axis; or by a 'governor'-type linkage driven by a lead screw along the folding axis; or by a grooved driver-nut, adjusted by a lead screw along the axis, which drives levered extensions of the upper and lower spar pivots.

Folding is accomplished by displacing the lower spar around a hinge axis to swing up to be tucked under the camera mounting portion of the stabilizer. Preferably the upper and lower spars are curved and positioned in or parallel to a plane that includes the camera's lens axis and is perpendicular to the camera's mounting surface. This configuration in particular lends itself to the folding and balancing hinge assembly providing one or more attachment points for weights or camera equipment, such as a video monitor, to provide additional inertial stability.

Illustrative embodiments of the invention provide an angle-adjusting component that symmetrically alters the pivot angles of both the upper and lower spars. Once the angle adjustment is made, it is maintained even when the apparatus is folded and unfolded. Both spar pivot angles are symmetrically increased or decreased, thus changing the fore/aft hinge angle by exactly half as much, and therefore not altering the final position of the folded lower spar.

An attachment mechanism, such as expanding clamps, can be provided for attaching the upper and lower hinge pivots, camera mounting stage, and lower weight attachments to the respective upper and lower spars.

The folding lower spar can be docked under the camera mounting stage and adjacent to the handle assembly when it is raised to the storage position, for example, by providing a notched detent or other suitable locking or attachment mechanism.

A provision may be included, such as a similarly expanding clamp system, for mounting an attachment for a series or weights that can incrementally counterbalance cameras of other varying weights.

The expanding clamp may be adapted to attach an extension component, preferably deployed as a reverse 'recurve' extension of the lower spar, which spaces the counterweights further from the center of balance of the entire assembly, and thus requires fewer of them.

Embodiments of the invention may provide attachments at the double-acting hinge and at the extremity of the lower spar for either weights or camera equipment masses which, along with the mass of the camera, provide increased inertial stability in three, mutually-perpendicular axes.

Methods for balancing and folding an equipment support system are also disclosed.

DESCRIPTION OF THE DRAWINGS

For further detail regarding embodiments of the improved hinge apparatus for a stabilized hand-held support for lightweight camcorders produced in accordance with the present invention, reference is made to the detailed description which is provided below, taken in conjunction with the following illustrations.

FIG. 11 is a front view of a camera support assembly in a folded position according to an illustrative embodiment of the invention.

FIG. 18 is a side view of a camera support with an extension component according to an illustrative embodiment of the invention.

FIG. 19 is a side view of a camera support in a folded position including an outside-radiused extension tube that places the counterweight in a convenient 'shoulder-mount' position according to an illustrative embodiment of the invention.

FIG. 20 is an isometric view of a hinge assembly that employs worm wheels and a worm gear along the hinge axis to effect balancing according to an illustrative embodiment of the invention.

FIGS. 21a-d show four views of a hinge assembly employing sections of worm wheels and a worm gear in folded and unfolded positions, including detail of locking arrangements according to an illustrative embodiment of the invention.

FIG. 23 shows another illustrative embodiment of a double acting hinge apparatus employing a governor-type linkage driven by a lead screw.

DETAILED DESCRIPTION OF THE INVENTION

Embodiments of the invention provide a double-acting hinge assembly that adjustably alters the fore/aft pivot angle between an upper and lower spar of a hand-supported camera stabilizing apparatus and also alters the lateral pivot angle of the spars by half as much, and therefore provides that the folded position of the lower spar consistently docks beneath the camera mounting assembly.

In an illustrative embodiment of the invention, a simple, light and rigid clamping mechanism is provided to interconnect the various components of a hand-held camera stabilizing support, including the camera stage, the upper spar, the hinge pivots, the lower spar, and the counterbalancing weights and/or counterbalancing equipment.

These and other characteristics are achieved in accordance with embodiments of the invention by providing a novel double-acting hinge mechanism, which simultaneously adjusts the vertical balancing angle between the upper and lower counterbalancing spars for a stabilized hand-held camera-support and the folding angle that provides for the displacement of the lower spar up to a consistent folding position beneath the camera-mounting stage assembly.

Illustrative embodiments of the present invention can be manufactured to provide an ultra-light, ultra-rigid aluminum construction that enables stable moving shots at unprecedented focal lengths and supports telephoto shooting. Hinges according to illustrative embodiments of the invention extend and retract to balance cameras as light as one pound, yet readily folds to a compact storage position.

The apparatus can be fabricated with a micrometer stage for precise horizontal balance, and precision caliper-adjusted vertical balance, and may be manufactured to be user serviceable.

Figure 2:
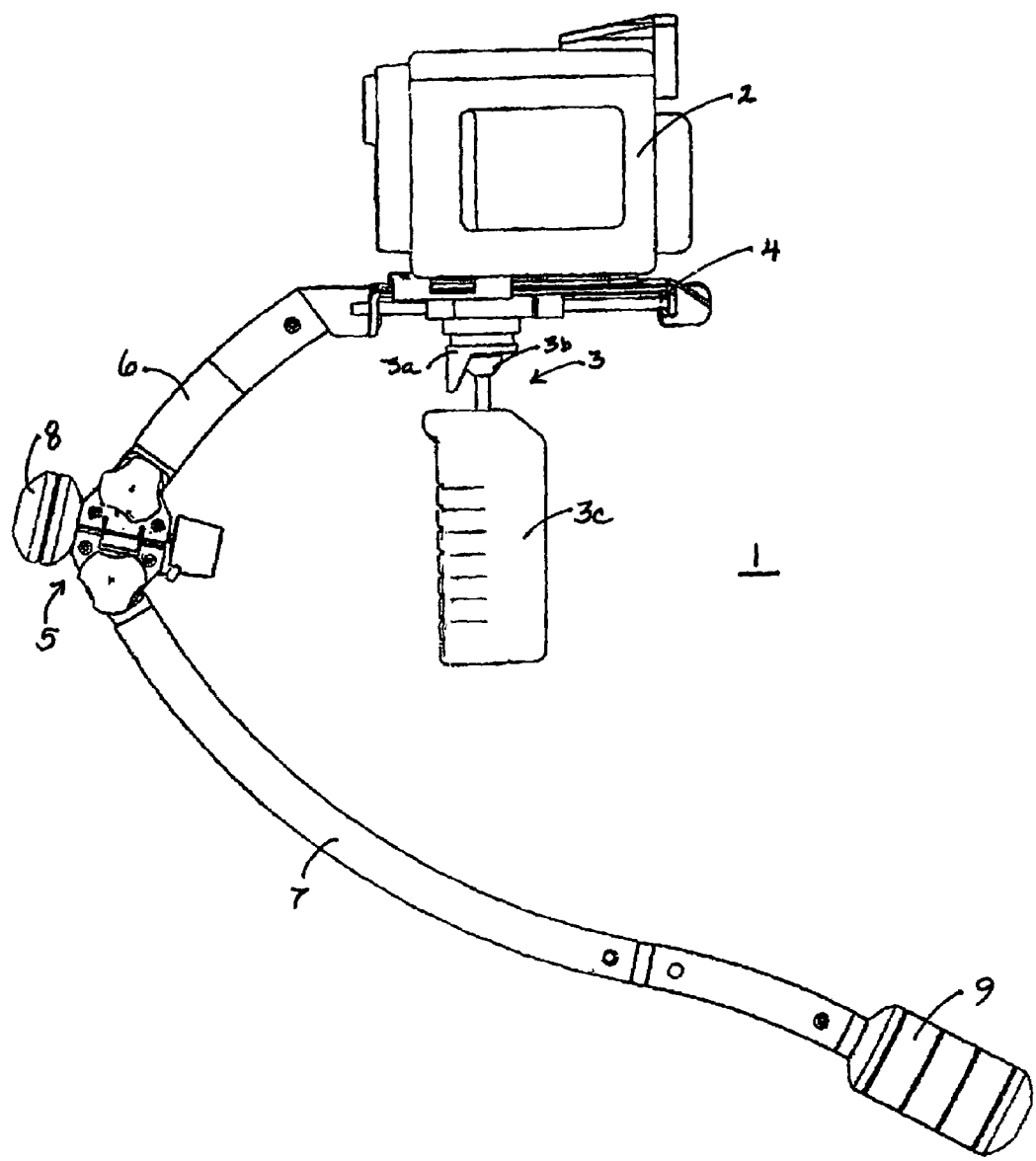
FIG. 2 is a side view of a handheld stabilized camera support with a double-acting hinge apparatus shown in a relatively opened balance position according to an illustrative embodiment of the invention.

FIG. 2 is a side view of a handheld stabilized camera support 1 with a double-acting hinge apparatus 5 according to an illustrative embodiment of the invention shown in an opened position. It is noted that reference to "opened" and "closed" positions throughout do not necessarily imply that the positions are "fully" opened or closed, as variations in the construction can cause Ø to vary with respect to the fully-opened and closed positions. Camera 2 is supported on mounting stage assembly 4. Angle Ø between upper spar 6 and lower spar 7 is adjusted by illustrative caliper-hinge assembly 5 to regulate bottom heaviness of the camera mounting assembly 1 as it is balanced and isolated in three mutually perpendicular axes by gimbal handle assembly 3, including gimbal guiding portion 3a, gimbal 3b and handle 3c. Weights 8,9 are provided to facilitate balancing of the camera on the support assembly.

Figure 3:
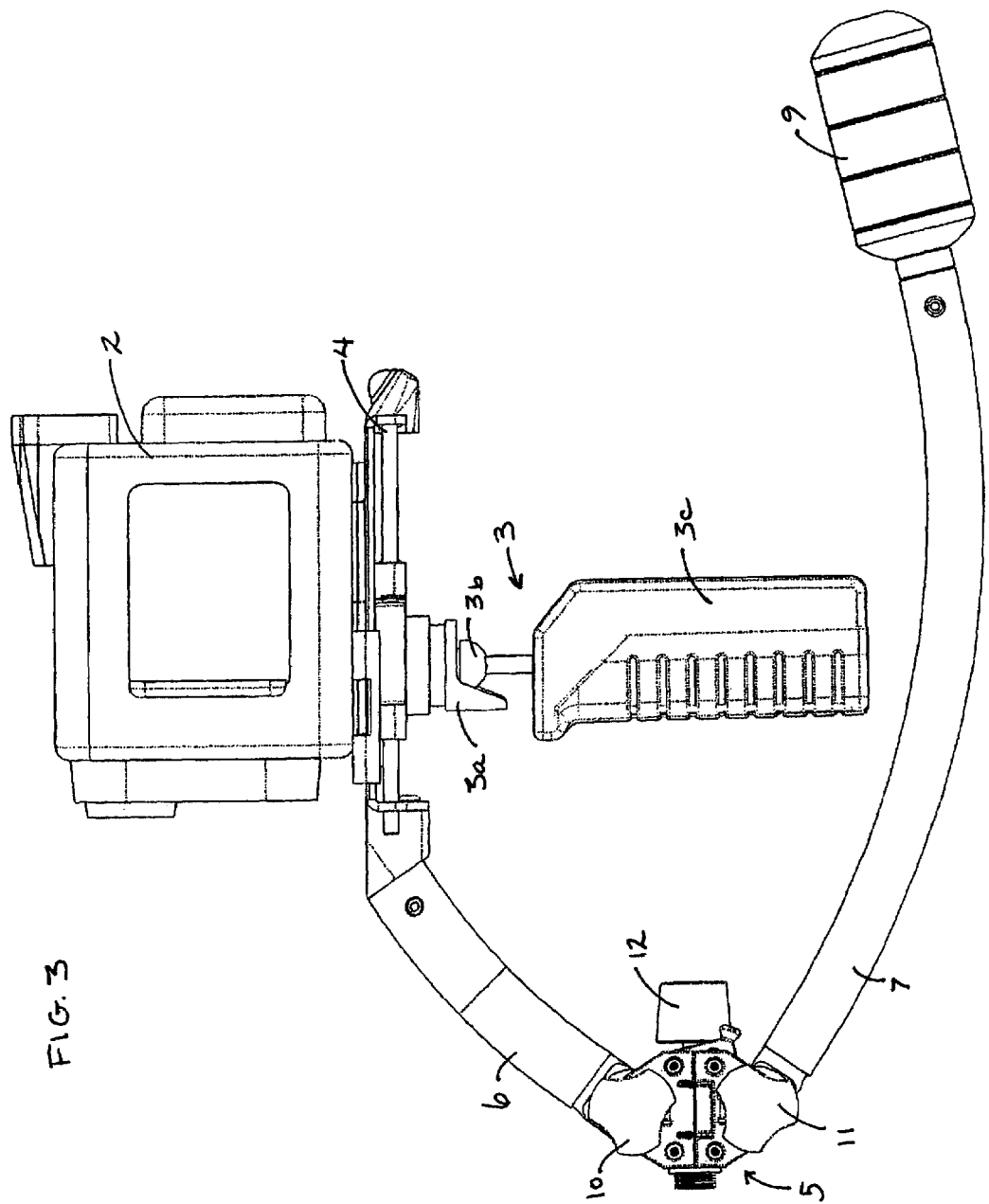
FIG. 3 is side view of the depicted hinge assembly of FIG. 2, except that the double-acting hinge is in a relatively closed balance position.

FIG. 3 is side view of the hinge assembly depicted in FIG. 2, except that the double acting hinge 5 is in a relatively closed, balance position, providing a reduced value for angle Ø between upper spar 6 and lower spar 7, and thus may generally be appropriate for balancing a light camera. Upper and lower locking knobs 10, 11 lock spars 6, 7 with respect to pivot balance axles 41 (shown in FIGS. 4 and 16). Knob 12 adjusts the spars with respect to pivot axles 41.

Figure 4:
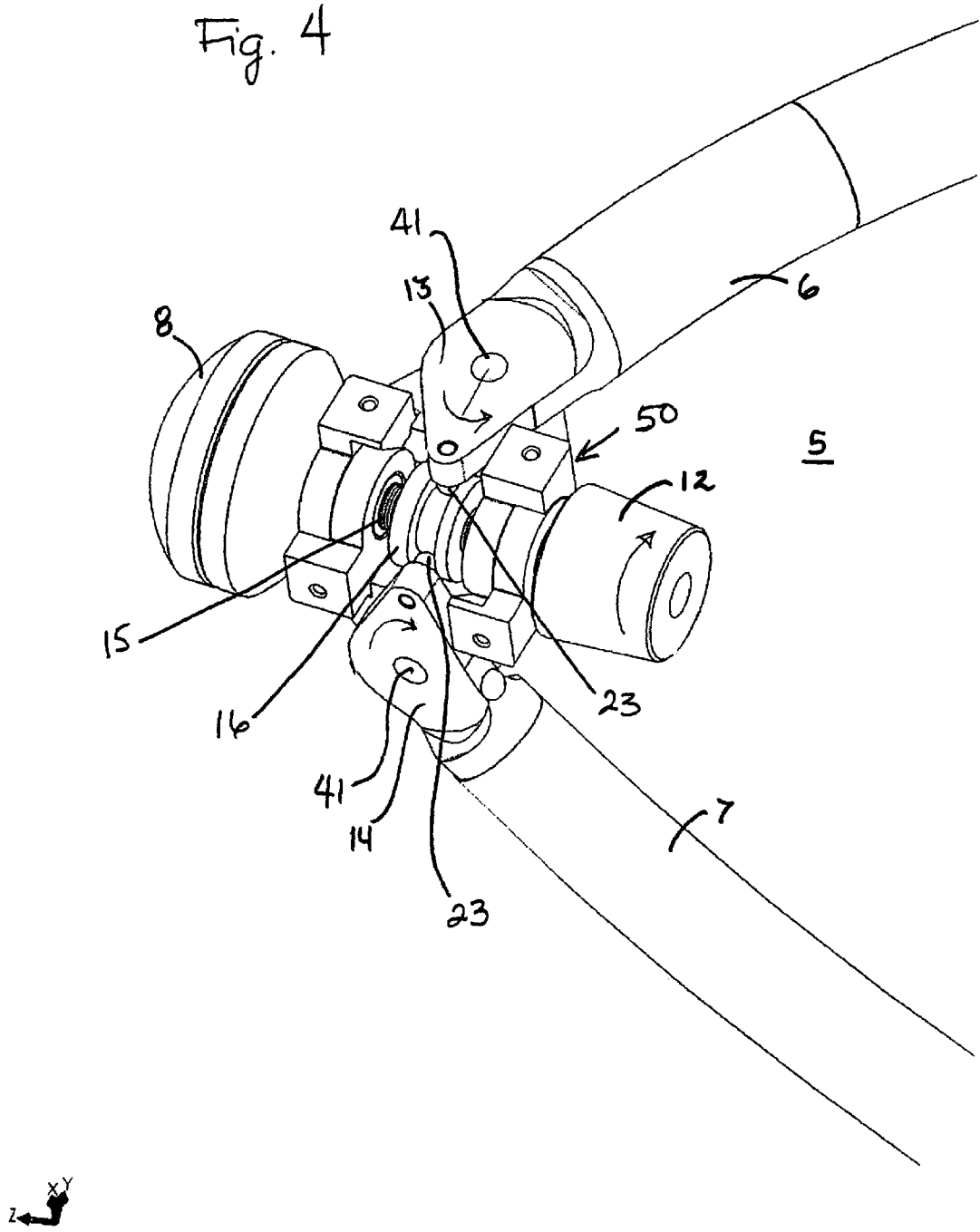
FIG. 4 is an isometric detail of a double-acting hinge shown in an intermediate balance position and partly folded according to an illustrative embodiment of the invention.

FIG. 4 is an isometric detail of a double-acting caliper hinge assembly 5 shown in an intermediate balance position and partly folded according to an illustrative embodiment of the invention. Driver nut 16 is adjusted along lead screw 15 by knob 12 to rotate pivots 13 and 14 by driver registrations screws 23, which engage a slotted center of driver nut 16. Pivots 13 and 14 allow spars 6 and 7, respectively to pivot with respect to the joint assembly 50. (See also FIG. 16) Weight 8 is shown attached to the hinged assembly at attachment point 8a (shown in FIG. 16)

Figure 5:
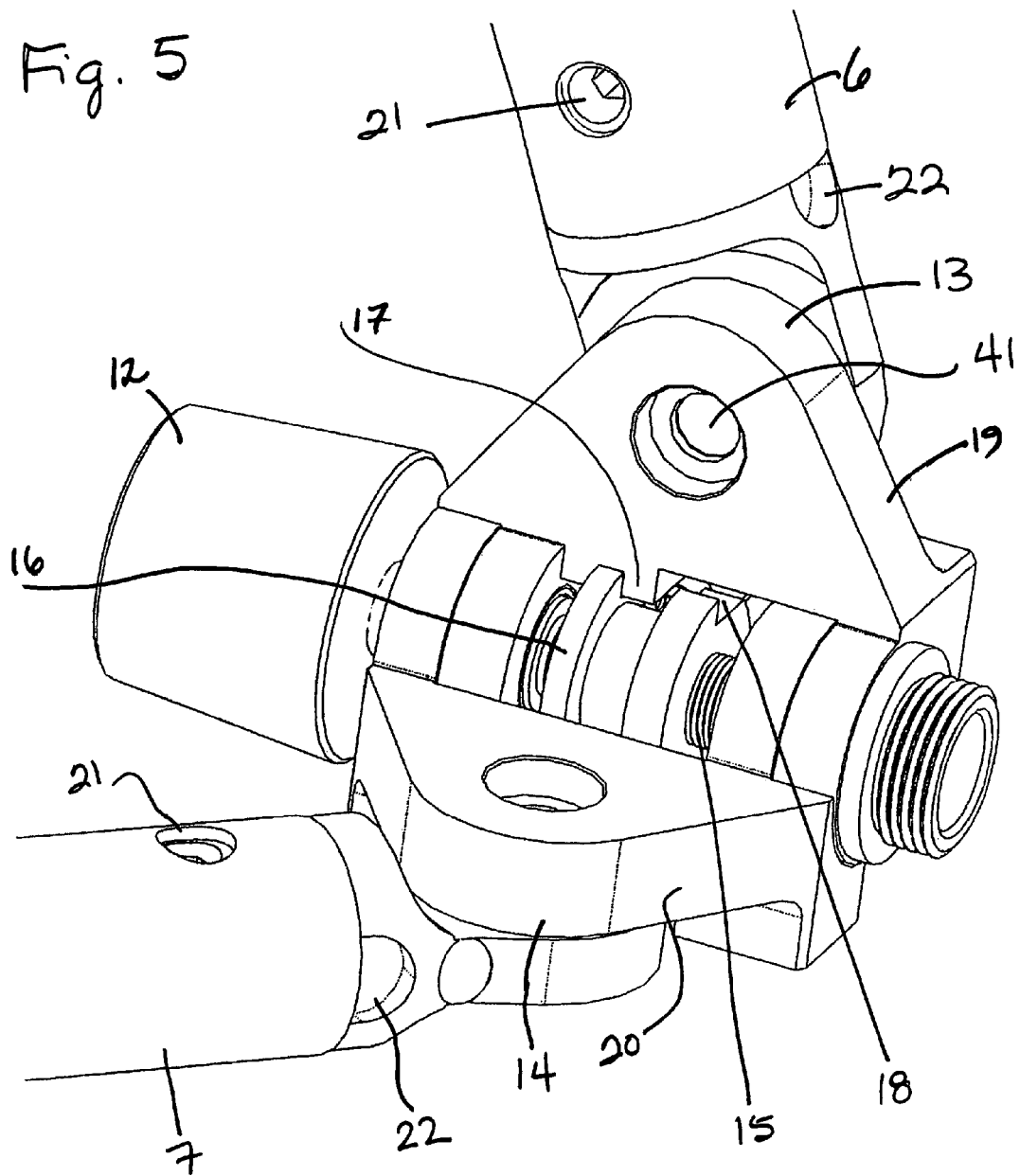
FIG. 5 is a view from the opposite side of the apparatus depicted in FIG. 4.

FIG. 5 is a view of the opposite side of the illustrative hinge depicted in FIG. 4, detailing an anti-rotation extension 17 that engages groove 18 in driver 16 so that rotation of lead screw 15 must move driver nut 16, instead of permitting driver nut 16 to rotate around lead screw 15. Expansion screws 21 connect pivots 13 and 14 to upper and lower spars 6 and 7 by expanding the barrels 42 (shown in FIG. 16) of pivots 13 and 14 internally to spars 6 and 7. Pivot 13 and 14 are connected to upper and lower hinge bodies 19 and 20, respectively. Wiring channels 22 provide compartments through which camera components can be connected. (See also FIG. 16 for details of components described in this paragraph.)

Figure 6:
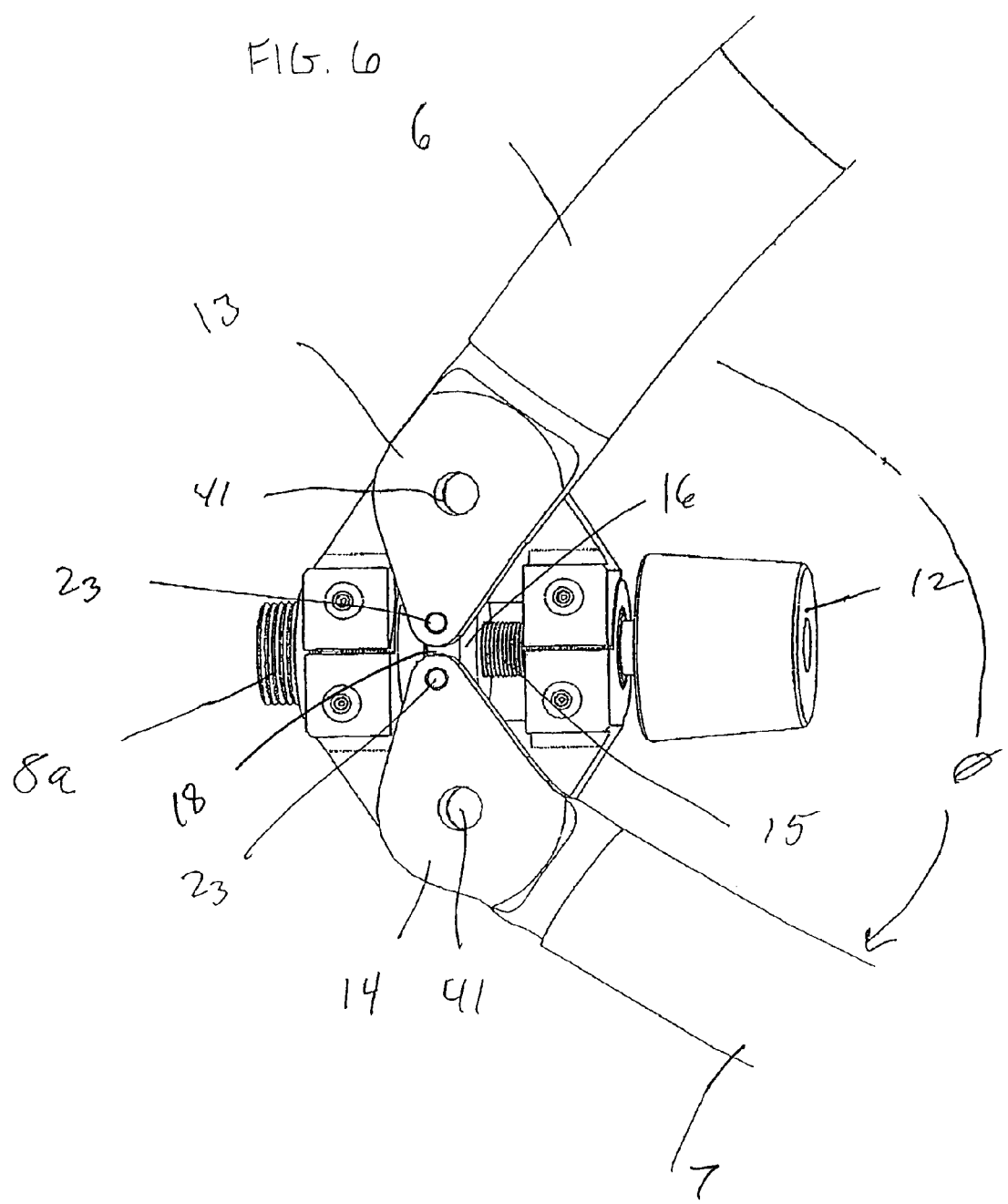
FIG. 6 is a side detail of a relatively closed hinge assembly according to an illustrative embodiment of the invention.

FIG. 6 is a side detail of a hinge assembly 5 contracted to provide a reduced angle Ø according to an illustrative embodiment of the invention. Pivots 13 and 14 rotate about pivot axles 41, driven by driver registration screws 23 engaged with groove 18 in driver nut 16. Pivot nut 16 is shown driven fully to the left side of the available aperture by lead screw 15.

Figure 7:
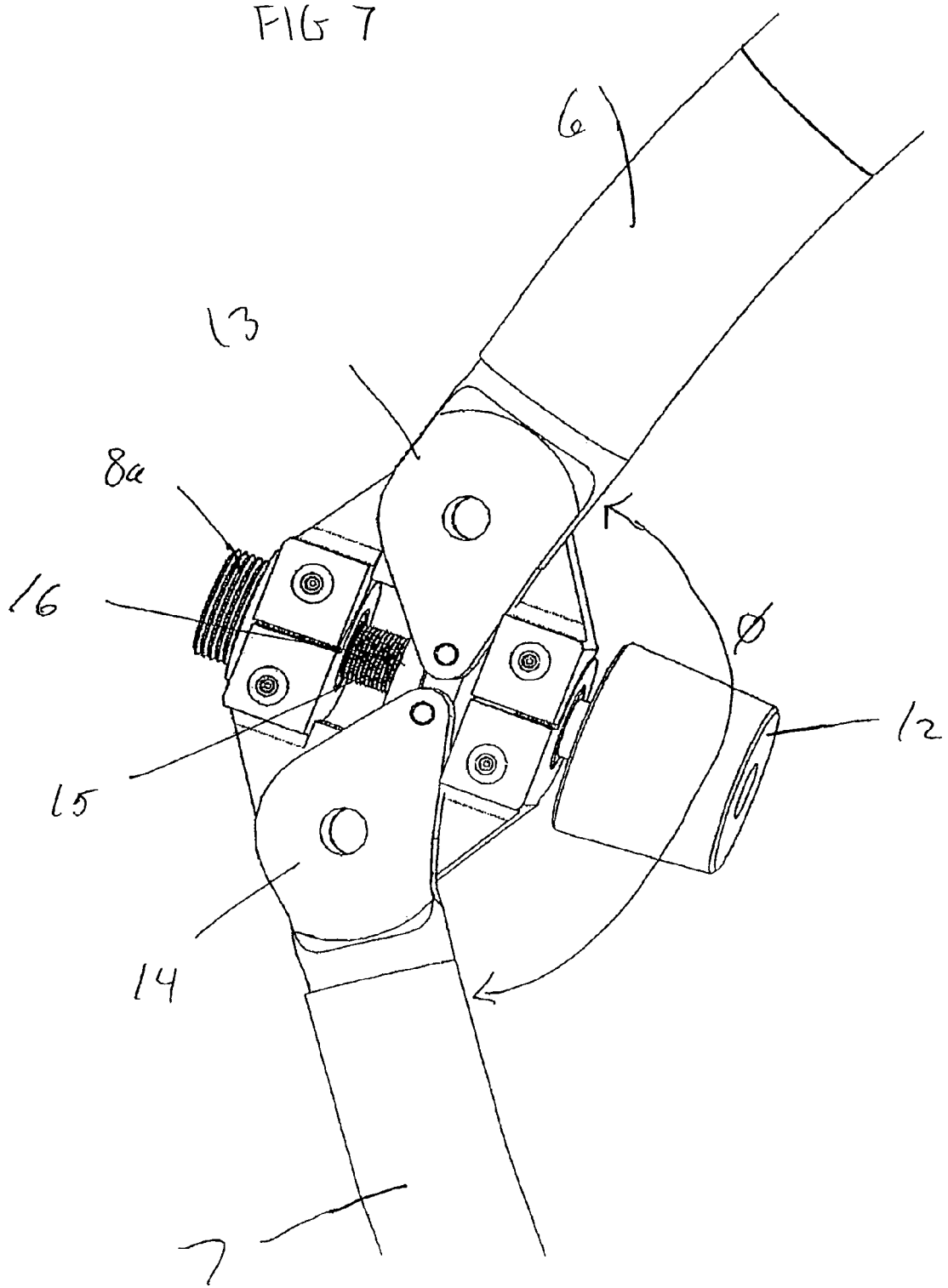
FIG. 7 is a side detail of a relatively opened hinge assembly according to an illustrative embodiment of the invention.

FIG. 7 is a side detail of an illustrative hinge assembly 5 expanded to provide a maximum possible angle Ø for this particular embodiment. Driver nut 16 has been driven fully to the right of the aperture available by lead screw 15, and thus would counterbalance a heavier camera than when in the position depicted in FIG. 6.

Figure 1:
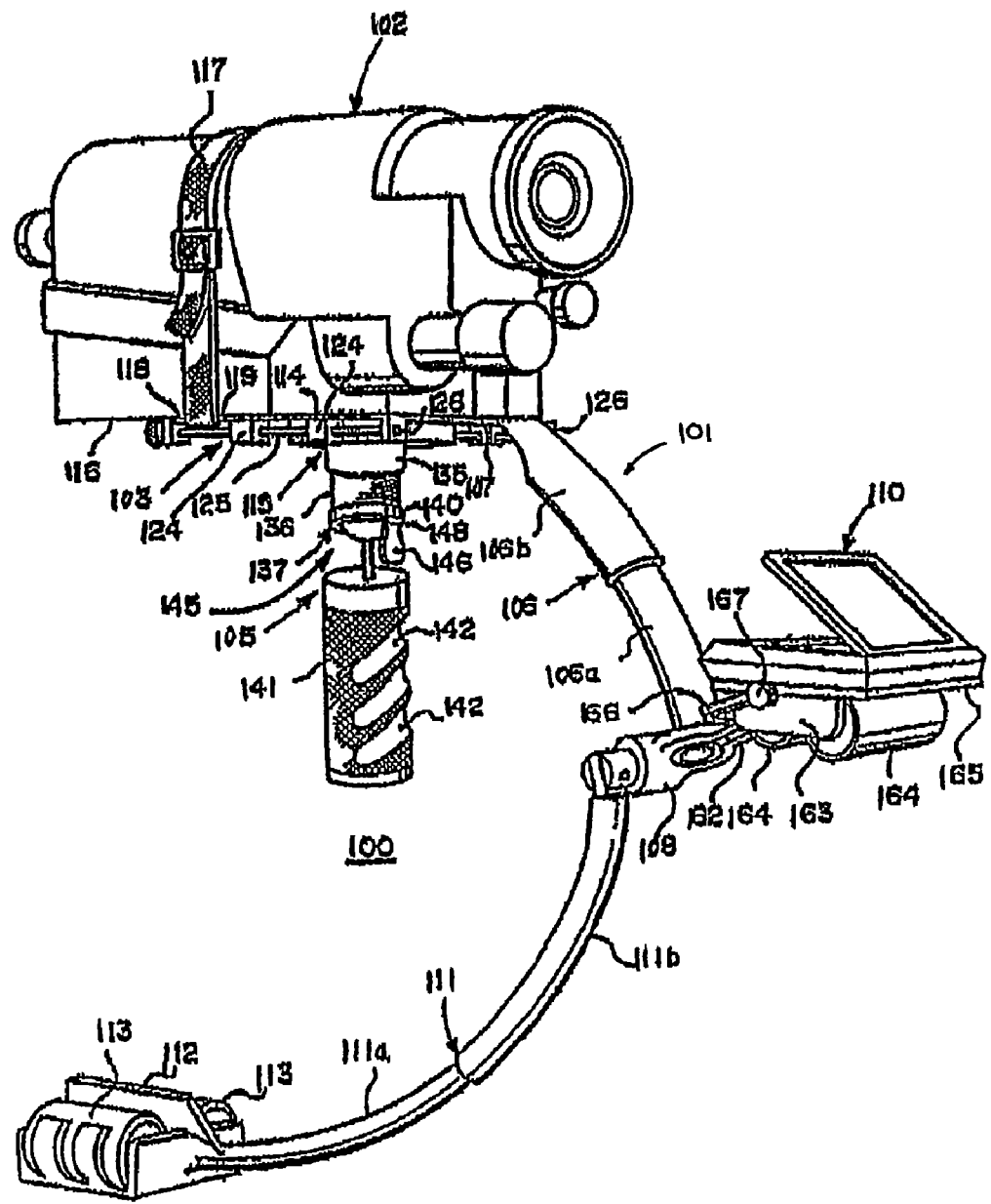
FIG. 1 generally illustrates a stabilized equipment support of the prior art which is primarily for use with lightweight cameras.
Figure 8:
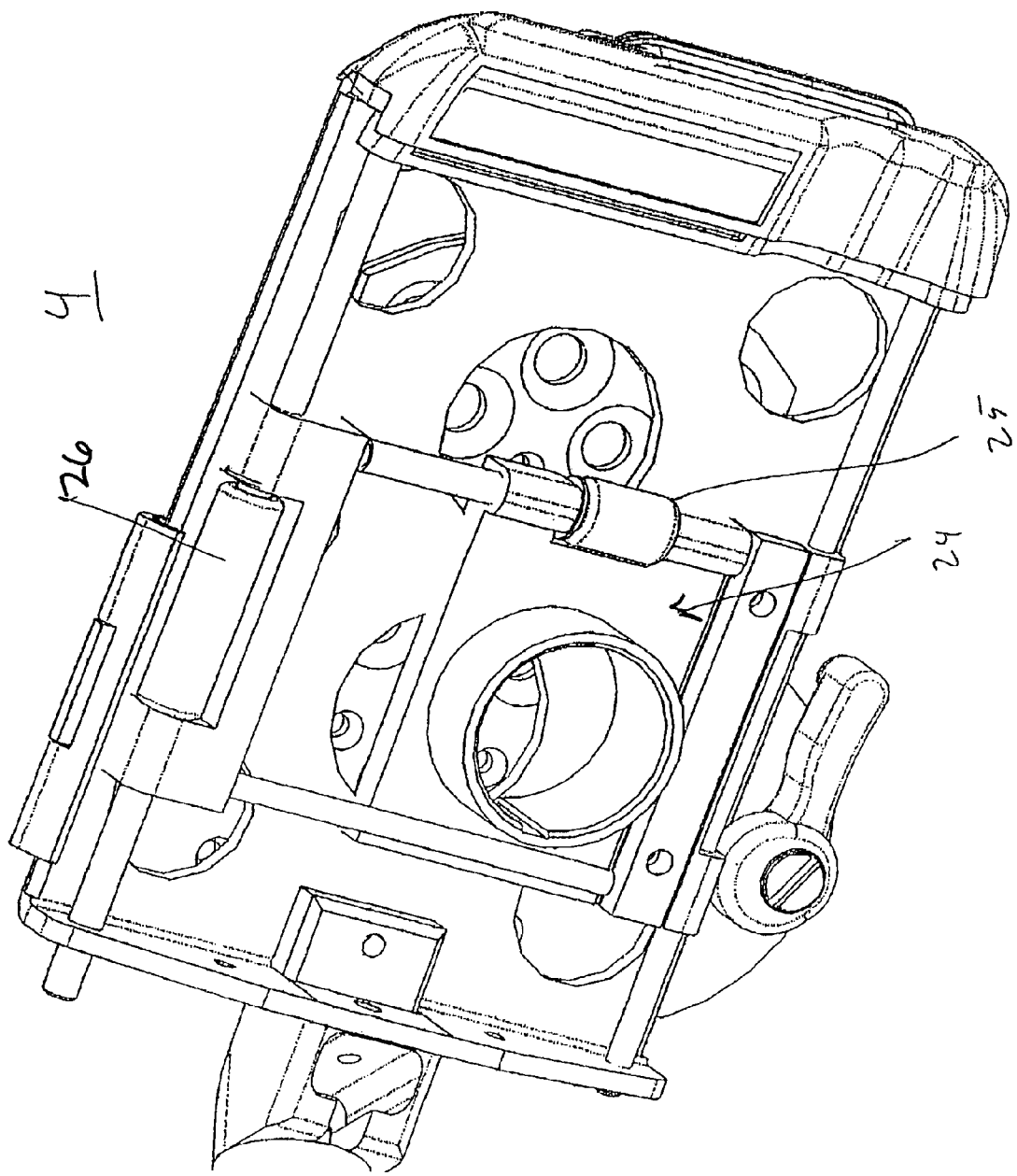
FIG. 8 is an isometric view of the underside of a camera mounting platform according to an illustrative embodiment of the invention.

FIG. 8 is an isometric view of the underside of an illustrative camera mounting platform 4 showing receiving hardware 24 for a gimbal (not shown) and its associated x axis and y axis camera balance trimming nuts 25 and 26, (as is differently numbered and described in the above captioned prior art of FIG. 1).

Figure 9:
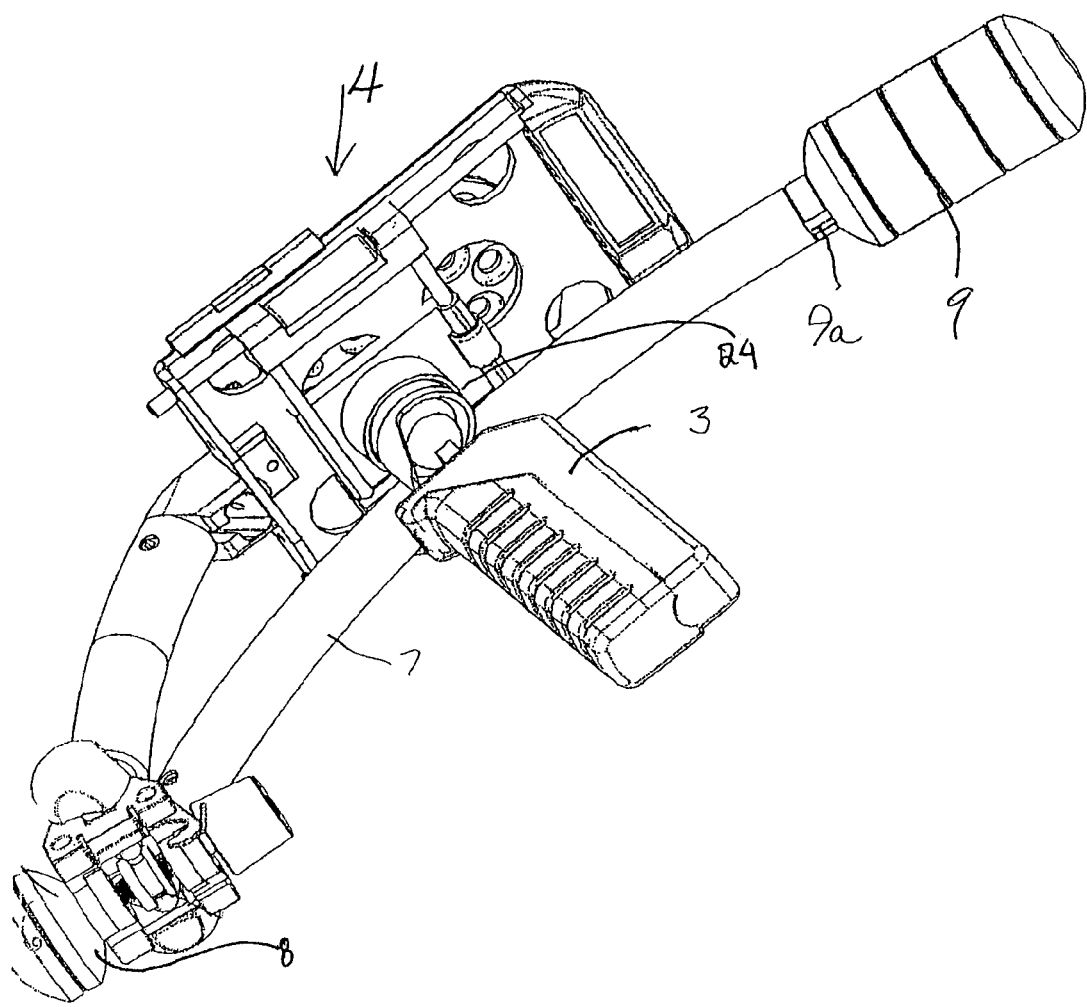
FIG. 9 is an isometric bottom view of a camera support assembly showing the lower spar in a folded position, and inertial weights according to an illustrative embodiment of the invention.

FIG. 9 is an isometric bottom view of a camera support assembly showing the lower spar 7 in a folded position tucked under camera mounting stage 4, alongside gimbal receiving mount 24 and gimbal handle assembly 3 according to an illustrative embodiment of the invention. This view shows inertial weight 8 mounted in a front position to provide additional angular inertia for the camera equipment. Weight 9 is shown attached to an end of lower spar 7 at attachment point 9a. It is noted that weights 8 and 9 can be of any form provided they are compatible with the apparatus and provide the necessary counterbalancing effect. The weights can have a dual function, such as being a part of the camera equipment.

Figure 10:
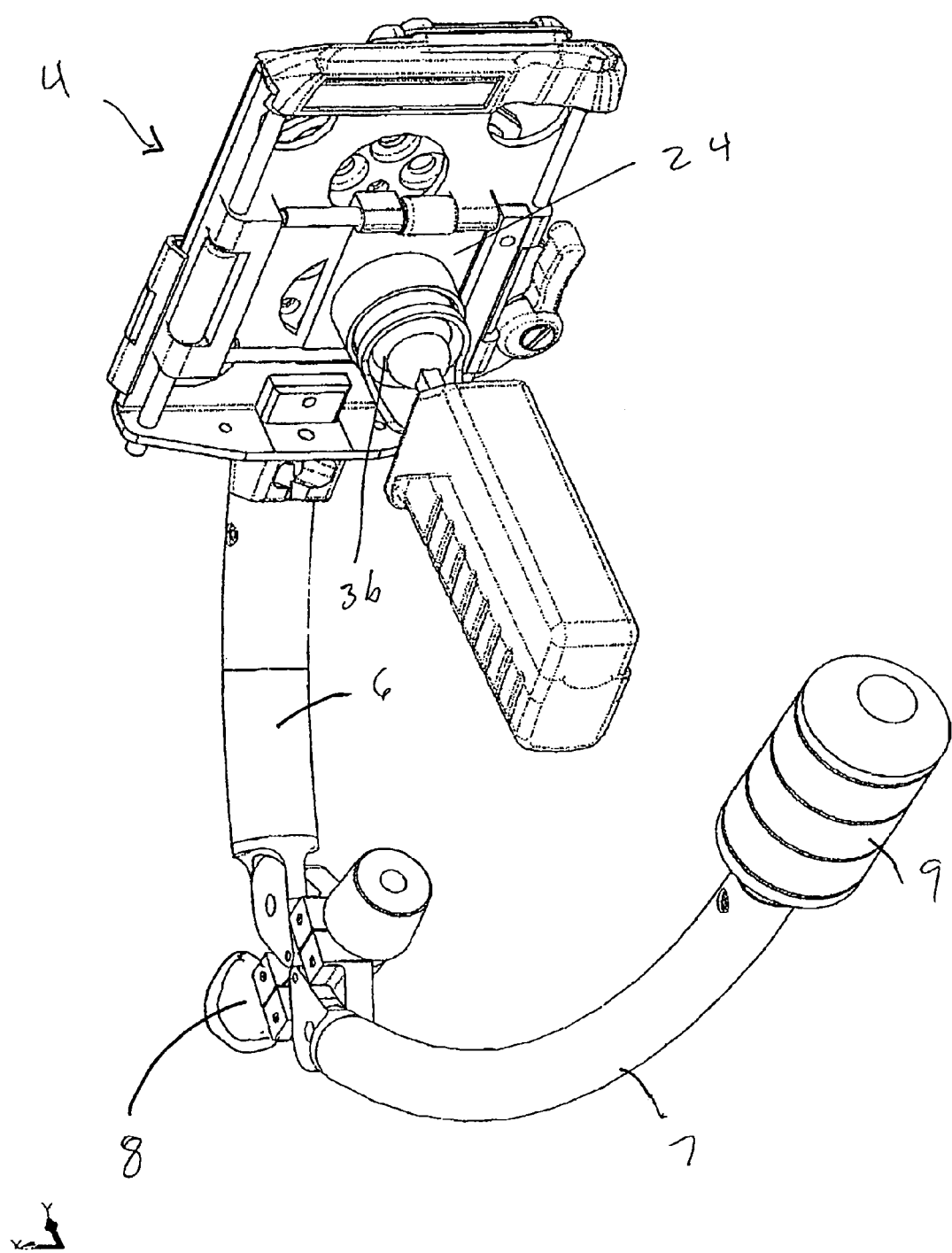
FIG. 10 is another angle of the hinge assembly depicted in FIG. 9 showing the lower spar unfolded in a balanced operating position.

FIG. 10 is a view of the camera support equipment of FIG. 9 with the lower spar 7 unfolded in a balanced operating position, and showing weights 8 and 9 in position to augment the rotational inertia of the assembly as balanced around gimbal 3b.

FIG. 11 is a front view of a camera support assembly in a folded position according to an illustrative embodiment of the invention.

Figure 12:
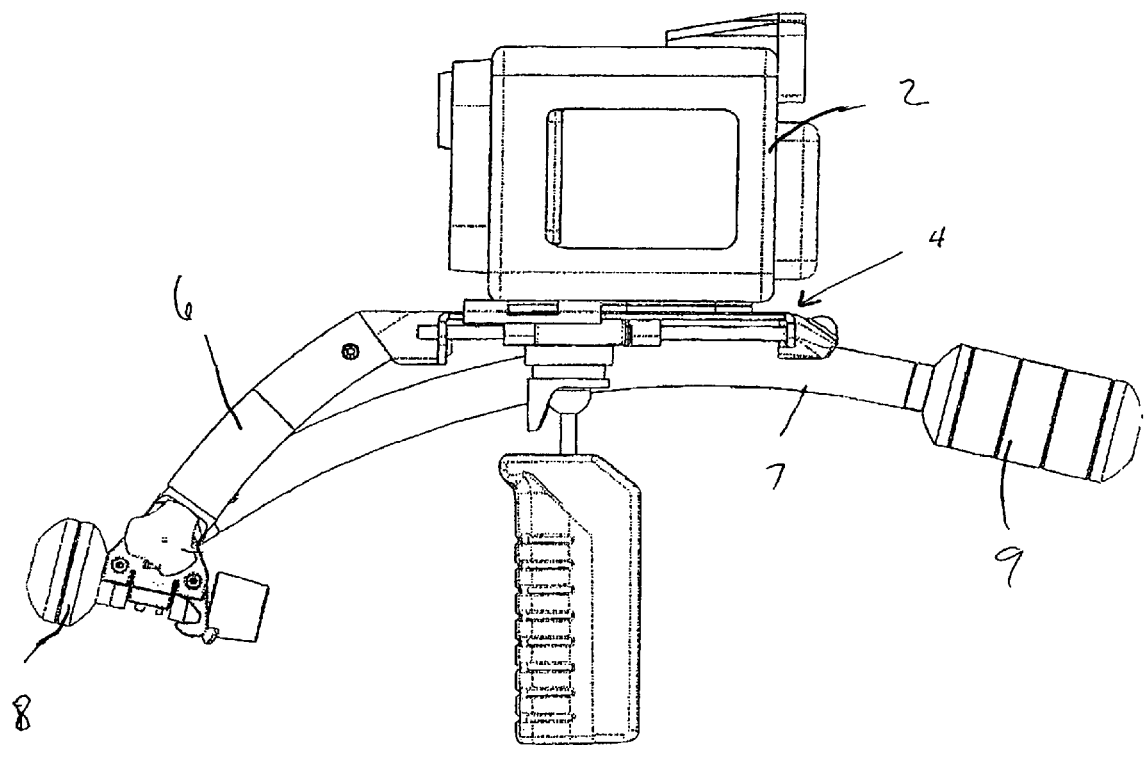
FIG. 12 is a side view of a camera support in a folded position according to an illustrative embodiment of the invention.

FIG. 12 is a side view of an illustrative camera support with a camera, in a folded position, showing weight 9 in position to act as a surface to conveniently rest on the shoulder of the operator in an alternate style of operating not involving the primary stabilizing function, yet still capable of providing the extra angular inertia of the separated masses 8 and 9.

Figure 13:
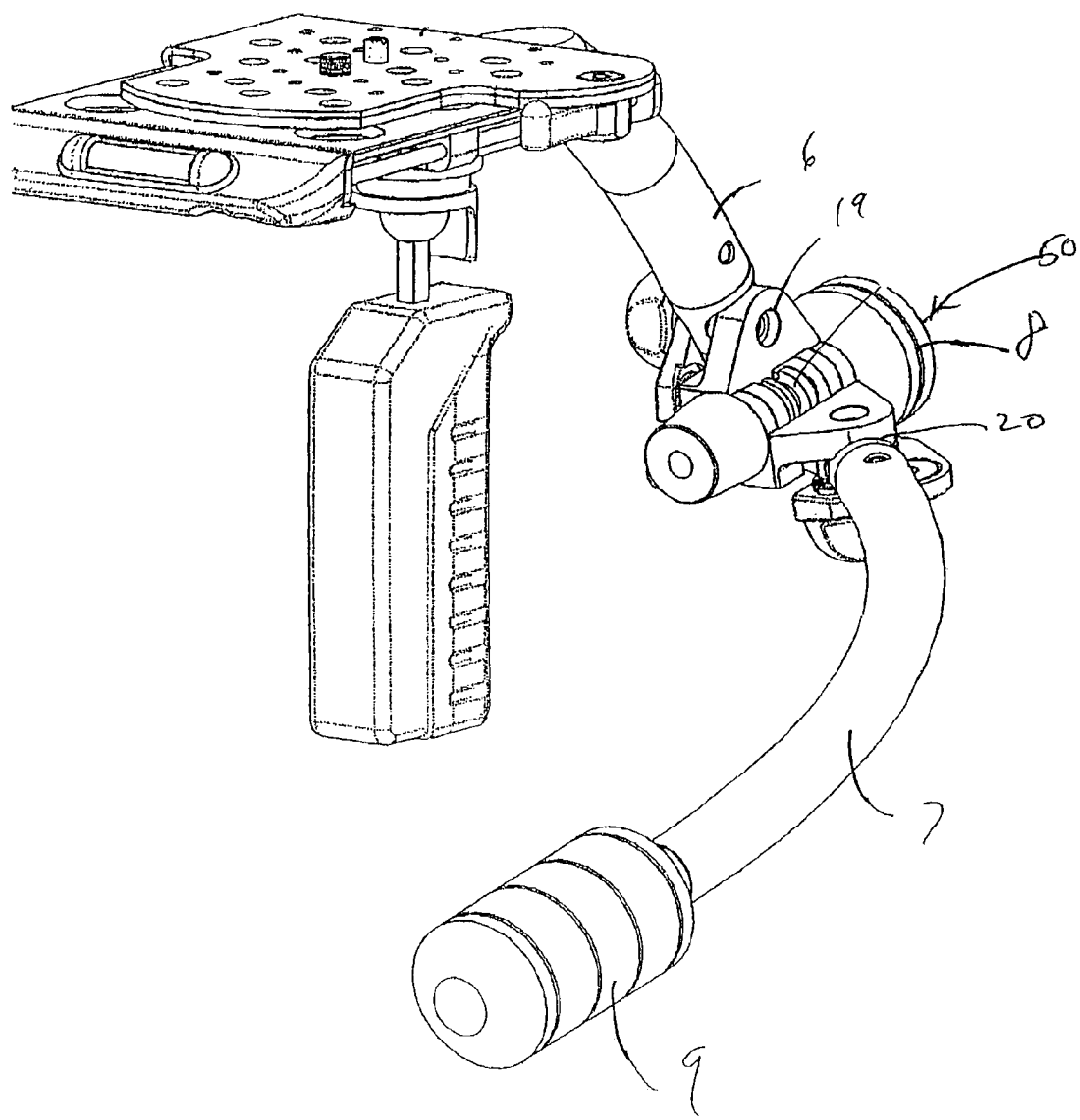
FIG. 13 is an isometric view of a camera support showing the lower spar in a partially folded position according to an illustrative embodiment of the invention.

FIG. 13 is an isometric view showing an illustrative lower spar 7 in a partially-folded position which may at times be positioned and balanced to enable resting the entire assembly on a table or other surface. To do so, a provision should be made to increase the friction between hinge bodies 19 and 20 and the joint assembly 50, such as by employing a frictionally locking device or the like, which could also serve as weight 8. (See also FIG. 16 for details of joint assembly 50, including hinge bodies 19 and 20.)

Figure 14:
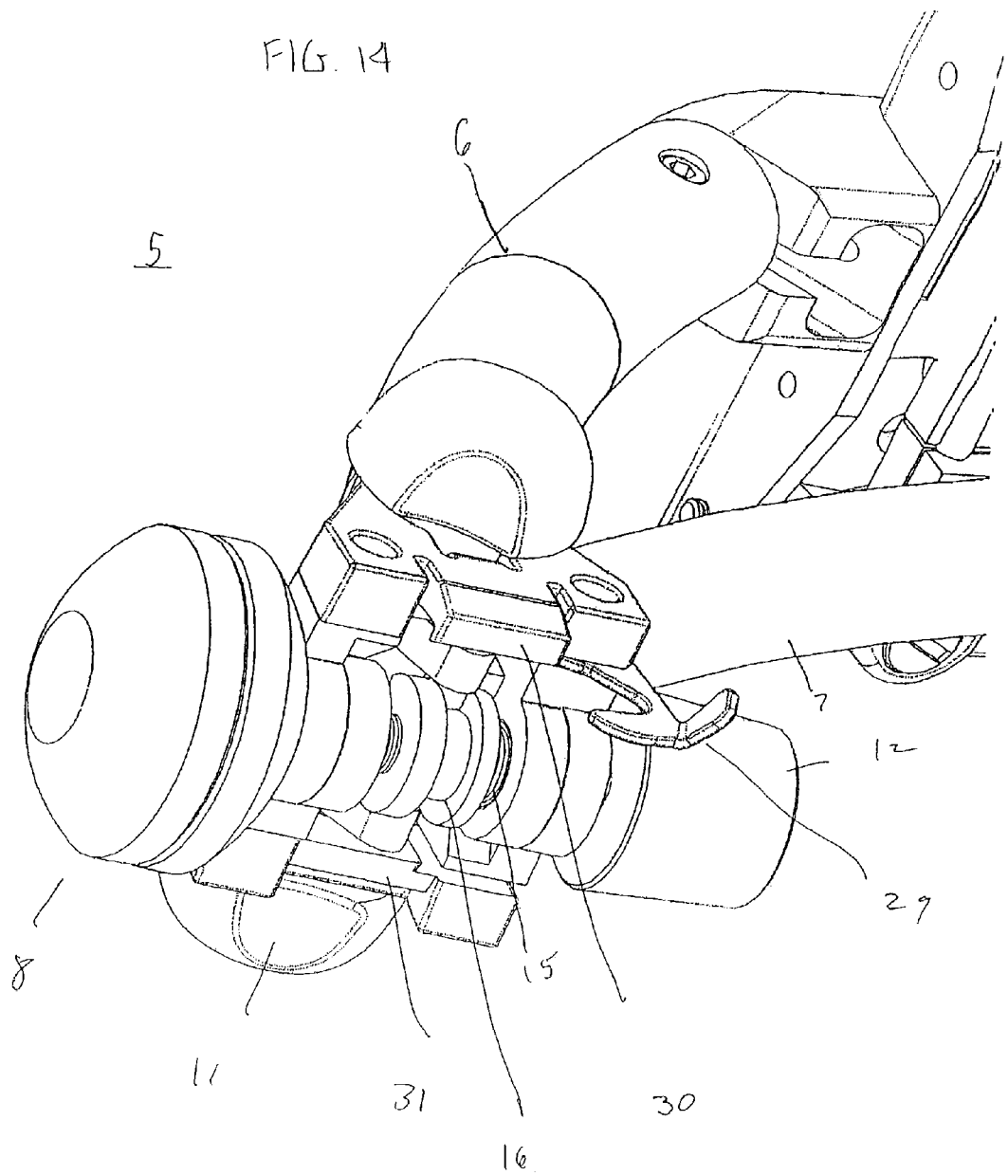
FIG. 14 is an isometric underside detail of a folded hinge assembly including a safety latch according to an illustrative embodiment of the invention.
Figure 16:
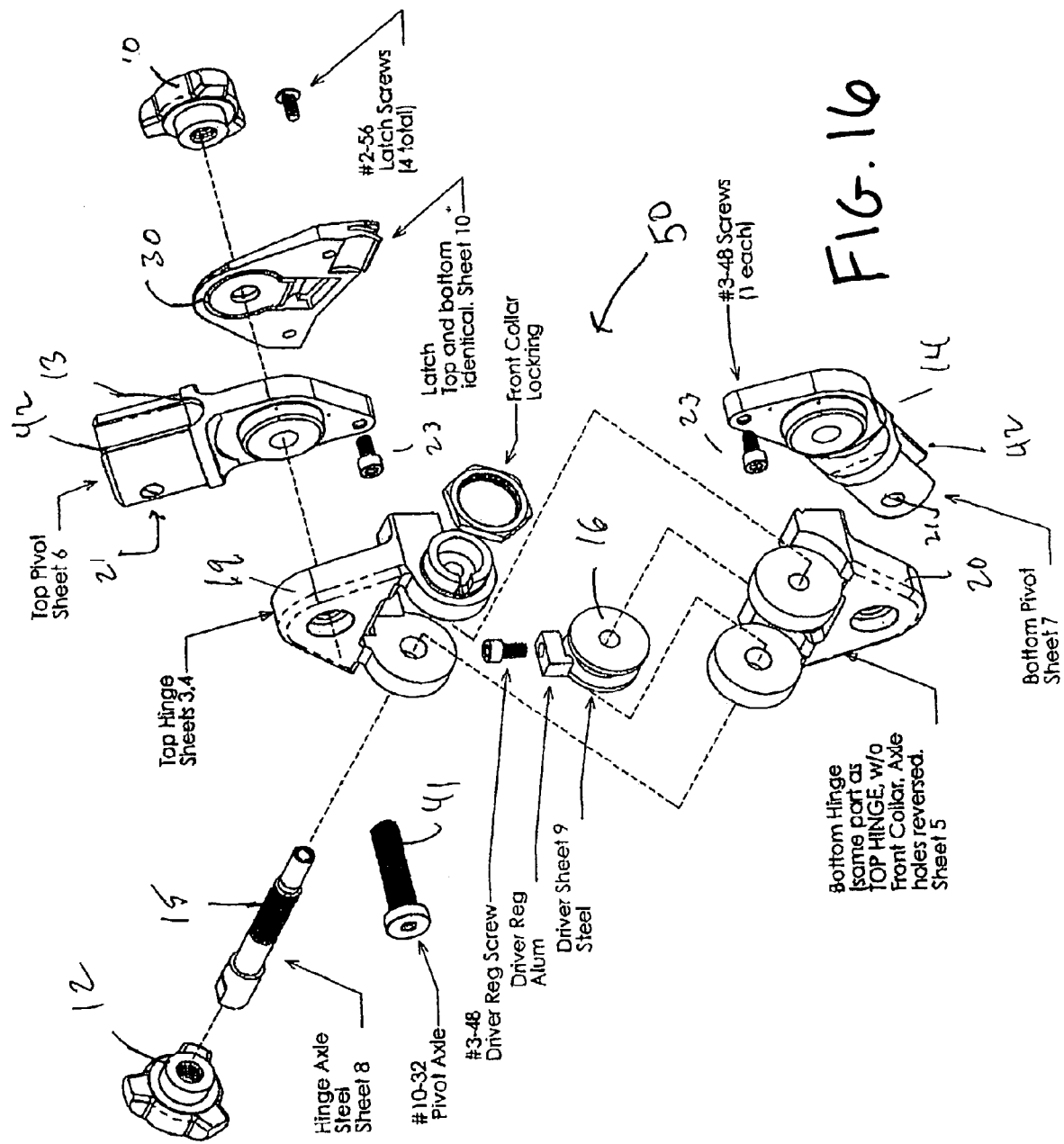
FIG. 16 is an exploded assembly view of components of an illustrative embodiment of the invention.

FIG. 14 is an isometric underside detail of a hinge assembly 5 in a folded position including a safety latch 29 (not workable in this position of the hinge) and detail of a resilient latch detent 30 and latch detent receiver 31, which would engage when hinge assembly 5 is unfolded to an open, operating position, all according to an illustrative embodiment of the invention. (A latch detent 30 is also depicted in FIG. 16.) Safety lock 29 is merely one possible configuration of a device that would hold the apparatus in an unfolded position. Many conventional locking devices may be compatible with embodiments of the present invention.

Figure 15:
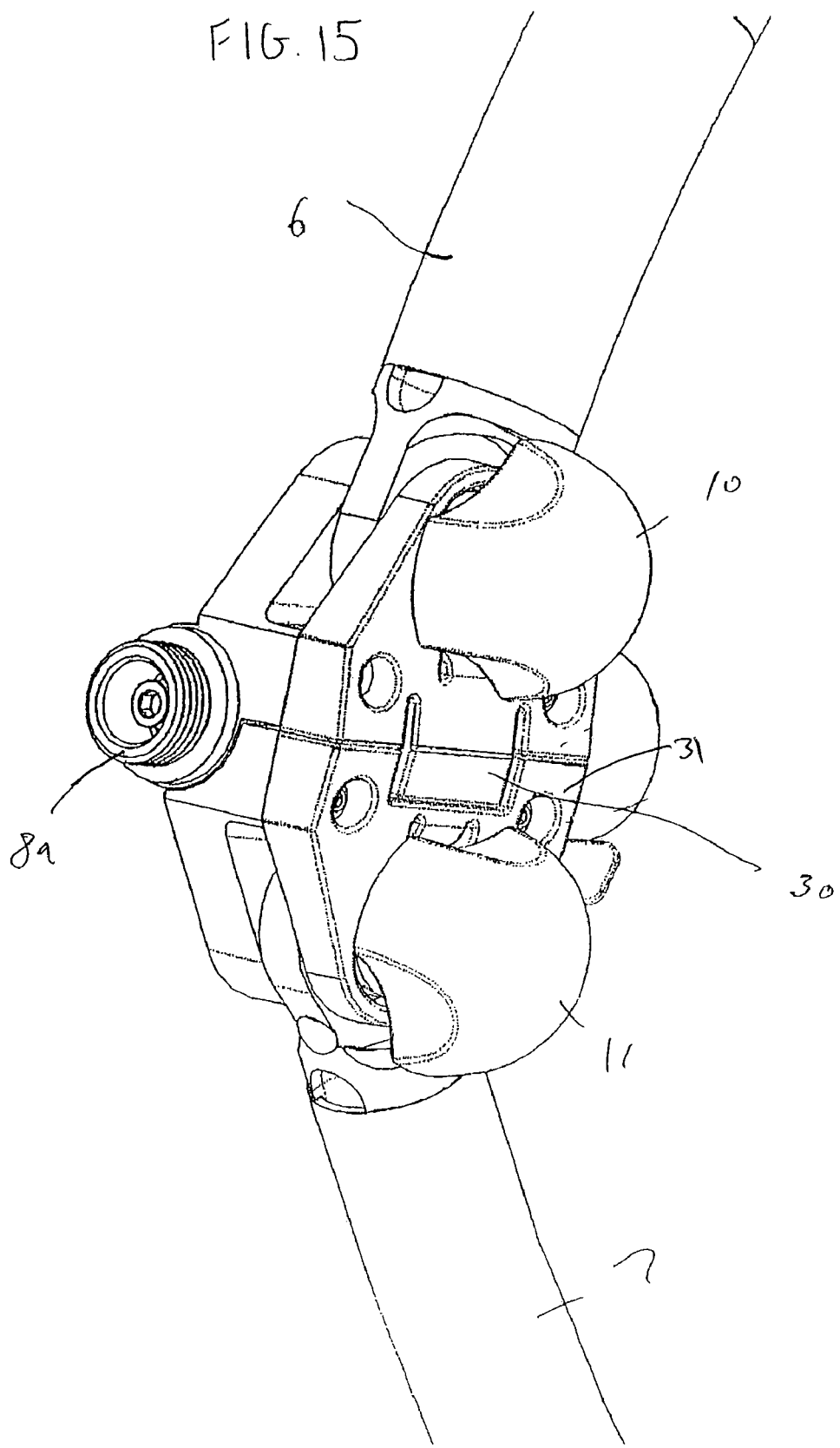
FIG. 15 is an isometric view of an unfolded, open hinge assembly detailing a resilient latch engaged with its receiving surface according to an illustrative embodiment of the invention.

FIG. 15 is an isometric view of an illustrative unfolded, open hinge assembly detailing the exemplary resilient latch detent 30 engaged with its receiving surface (hidden).

FIG. 16 is an exploded assembly view of components of a hinge assembly according to an illustrative embodiment of the invention. Parts are identified by numbers used in other figures to identify analogous, but not necessarily identical parts. Hinge bodies 19 and 20, and pivots 13 and 14 are shown. Further depicted are split barrel portions 42 and expansion screws 21, which can be seen on parts 42. Also depicted are driver nut 16, lead screw 15, adjusting knob 12 and one pivot axle screw 41.

Figure 17:
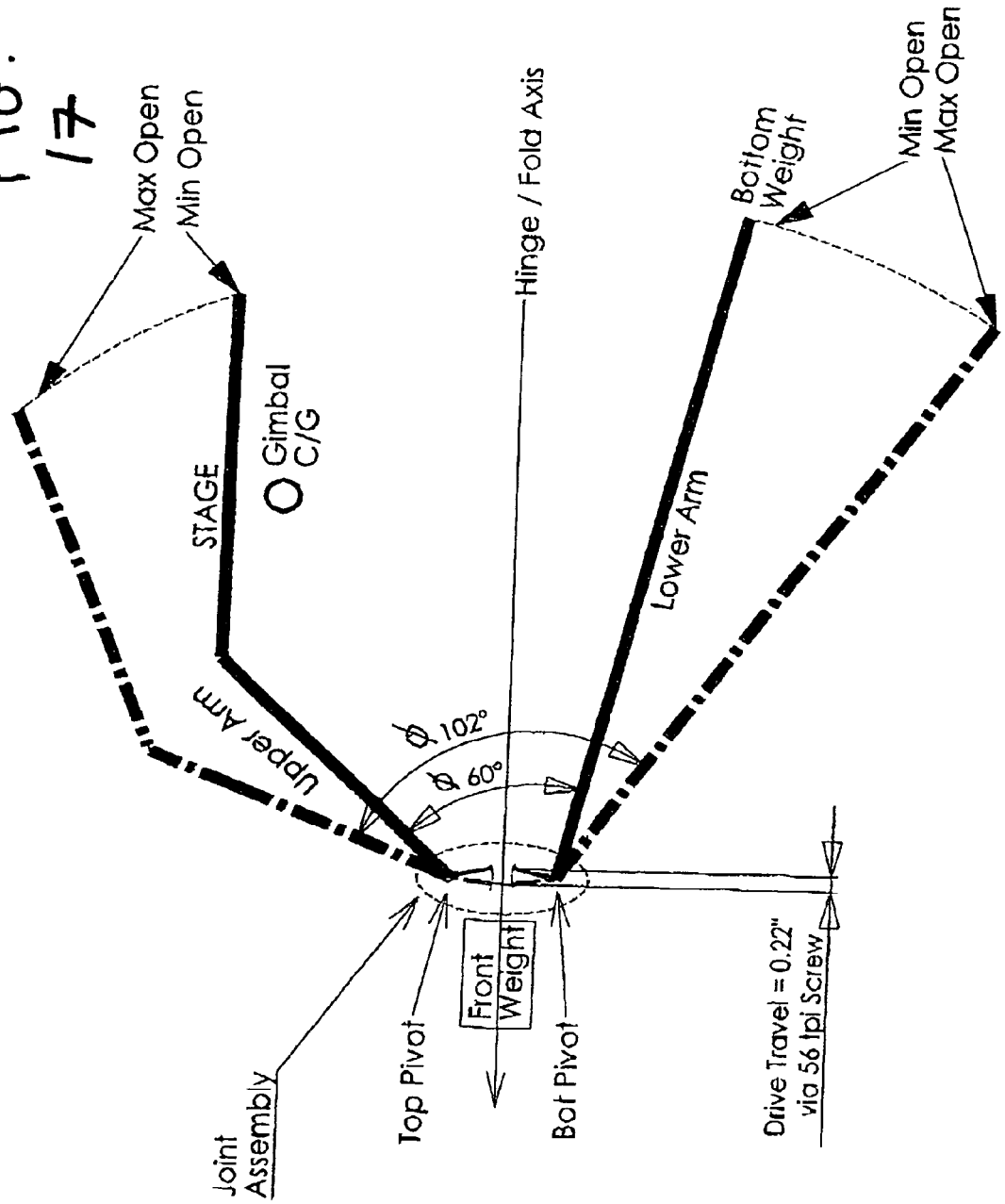
FIG. 17 diagrammatically illustrates the range of pivot adjustment for upper and lower spars via full excursion of the hinge driver mechanism according to an illustrative embodiment of the invention.
Figure 22C:
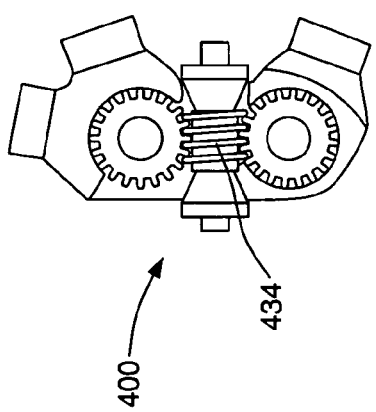
FIGS. 22a-d depict four solid-model views of the hinge assembly of FIGS. 20 and 21.
Figure 22D:
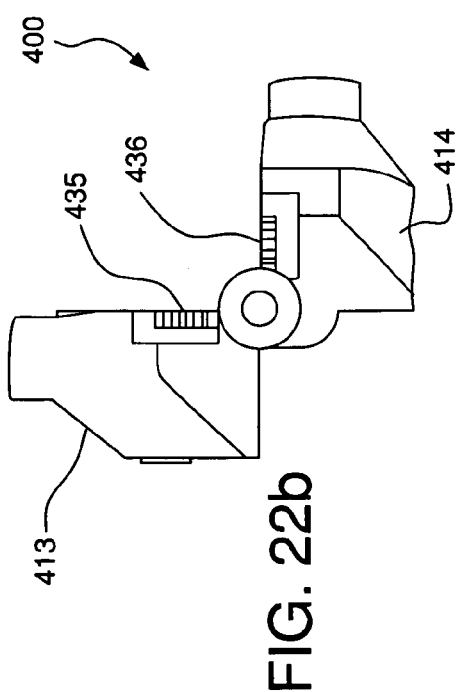
Figure 22A:
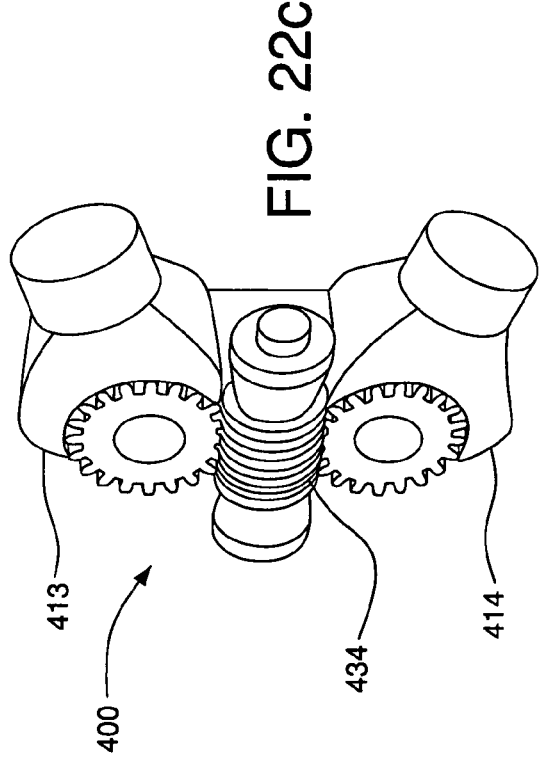
Figure 22B:
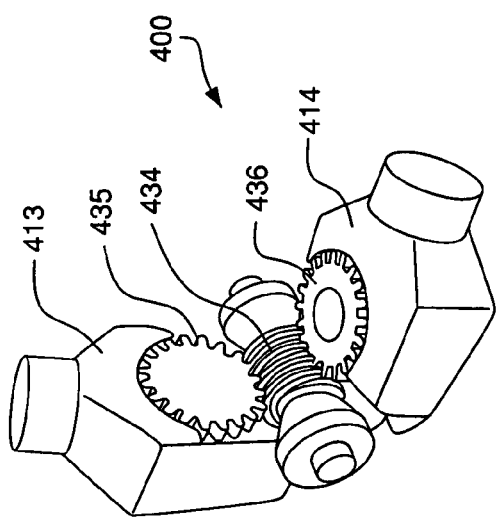

FIG. 17 diagrammatically illustrates the range of pivot adjustment angles Ø for upper and lower spars through the full potential excursion of the hinge driver mechanism according to an illustrative embodiment of the invention. This embodiment shows a minimum angle Ø of 60° and a maximum of 102°. Other minimum and maximum angles are possible provided the desired assembly balance can be achieved and spars do not interfere with assembly components in a folded position. Various stopping mechanisms may be employed to limit the maximum and minimum angles. These mechanisms may allow adjustments of these limiting angles.

FIG. 18 is a side view of an illustrative embodiment of the invention with an extension component 32 connected to lower spar 7 by a clamp 33. Extension 32 may be oppositely curved to lower spar 7 (its outside radius vs. the inside radius of lower spar 7), and thus positions lower counterweight 9 further down for balancing heavier cameras. Extension 32 is attached to spar 7 at attachment point 9a, and to weight 9 at attachment point 32b. Extension 32 permits use of fewer weights than direct attachment of weights higher up at position 9a on lower spar 7, or balancing of heavier equipment. Extension 32 may be solid or tubular, for example as can spars 6 and 7. Other cross-sectional configurations can also be used. Although aluminum is a desirable material for all or some of the apparatus parts in many applications, other materials are within the spirit and scope of the invention. Thus far, spars 6,7 have been depicted as being curved. It is noted that other shapes are in the spirit and scope of the invention. Spar shape need only provide the proper distribution of weight for balancing purposes, and allow for suitable folding once adjusted for the camera operating mode.

FIG. 19 is a side view of an illustrative lower spar 7 in a folded position including the outside-radiused extension 32 that may now place counterweight 9 in an extended and even more ergonomic 'shoulder-mount' position, which is particularly useful for the heavier cameras that would most benefit from use of extension 32.

FIG. 20 is an isometric view of a hinge assembly 200 attached to spars 206 and 207. Hinge assembly 200 employs worm wheels 235 and 236 associated with worm gear 234 along a hinge axis 242 to effect balancing by adjustment of angle Ø according to an illustrative embodiment of the invention. FIG. 20 further depicts upper and lower hinge bodies 219 and 220 with upper and lower pivots 213 and 214.

FIGS. 21a-d show four detailed views of an embodiment of the invention employing sections of worm wheels and a worm gear in folded and unfolded positions, including detail of illustrative locking arrangements. FIG. 21a is a side view of hinge assembly 300 to which spars 306 and 307 are attached, showing worm gear 334 and worm wheels 335 and 336. FIG. 21b is an end view detailing the split form worm wheels 335 and 336, which approximate a complete worm wheel when positioned in the folded position shown, but which function independently when the assembly is opened. In this embodiment, one of the pivot axles 341 should be locked in order not to have the folded and unfolded positions vary unpredictably due to the random effect of the worm gear on both worm wheels if both are unlocked. If one pivot axle 341 is locked, its relationship to the worm remains fixed and registers the action of locking and unlocking. FIG. 21c shows an end view of locking detail including spring lock catch 337. FIG. 21d shows an alternate locking pin 340.

FIGS. 22a-d show four solid-model views of another illustrative embodiment of a worm-gear style hinge mechanism 400 in various positions of folding and unfolding. Pivots 413 and 414 have worm wheels 435, 436 attached thereto. Worm wheels 435 and 436 rotate by engaging the threads of worm gear 434 to provide for folding of spars (not shown) attached to hinge mechanism 400 and balancing rotation of the attached spars.

FIG. 23 shows yet another illustrative embodiment of a double acting hinge apparatus 500, employing a governor-type linkage driven by a lead screw 515, which is controlled by adjustments knob 512, and drives combined pivot driver 516a, which in turn pushes tie rods 539 and 540 to respectively pivot upper and lower spars 506 and 507 about their respective balancing pivot axles 541 in association with hinge bodies 519 and 520 to open and close angle Ø. The apparatus is hinged to fold in unison at pivot driver 16a and between upper and lower hinge bodies 19 and 20.

While the invention has been described by illustrative embodiments, additional advantages and modifications will occur to those skilled in the art. Therefore, the invention in its broader aspects is not limited to specific details shown and described herein. Modifications, for example, to the materials and shapes of the spars and types of hinge mechanisms, may be made without departing from the spirit and scope of the invention. Accordingly, it is intended that the invention not be limited to the specific illustrative embodiments, but be interpreted within the full spirit and scope of the appended claims and their equivalents.

The invention claimed is:

1. An equipment support apparatus comprising:
   a double acting hinge having a body with an upper hinge section and a lower hinge section, each section pivotally attached to one another;
   an upper spar attached to the upper hinge section;
   a lower spar attached to the lower hinge section;
   the upper hinge section and the lower hinge section foldable toward one another about a folding axis to bring the lower spar toward the upper spar into a folded position; and
   the upper spar and lower spar each pivotally connected to its corresponding hinge section around a balancing axis to balance the equipment in a balanced position, wherein the folded position is not substantially altered when the spars are pivoted about the balancing axes to balance the equipment and the apparatus retains the balanced position after the apparatus is unfolded.

2. The equipment support apparatus of claim 1 wherein the upper spar is pivotally connected to the upper hinge section and the lower spar is pivotally connected to the lower hinge section.

3. The equipment support apparatus of claim 1 wherein one or more of the upper hinge section, lower hinge section, lower spar, and upper spar is pivotally adjustable by a worm wheel mechanism.

4. The equipment support apparatus of claim 1 wherein one or more of the upper hinge section, lower hinge section, lower spar, and upper spar is pivotally adjustable by a governor linkage.

5. The equipment support apparatus of claim 1 wherein one or more of the upper hinge section, lower hinge section, lower spar, and upper spar is pivotally adjustable by a grooved driver nut mechanism.

6. The equipment support apparatus of claim 5 further comprising an anti-rotation mechanism an extension protruding from the upper hinge section and positioned to engage the groove in the driver nut.

7. The equipment support apparatus of claim 1 wherein one or more of the upper hinge section, lower hinge section, lower spar, and upper spar is pivotally vernier adjustable.

8. The equipment support apparatus of claim 1 wherein one or more of the upper hinge section, lower hinge section, lower spar, and upper spar can be pivotally adjusted in discrete increments.

9. The equipment support apparatus of claim 1 further comprising a weight attachment mechanism at the hinge.

10. The equipment support apparatus of claim 1 further comprising a weight attachment mechanism on the lower spar.

11. The equipment support apparatus of claim 1 further comprising:
    a detachable weight attachment mechanism detachable from a lower end of the lower spar;
    a lower spar extension configured to accommodate the weight attachment mechanism at a lower spar extension first end and configured to connect to the lower end of the lower spar at a lower spar extension second end.

12. The equipment support apparatus of claim 1 further comprising a latch to secure the lower spar in an unfolded position.

13. The equipment support apparatus of claim 1 further comprising a latch to secure the lower spar in a folded position.

14. The equipment support apparatus of claim 1 wherein the lower spar is shaped to be used as a shoulder rest when the lower spar is in at least a partially folded position.

15. The equipment support apparatus of claim 1 further comprising a mounting stage attached to the upper spar.

16. The equipment support apparatus of claim 15 wherein the mounting stage is adjustable in a horizontal plane in two directions perpendicular to one another.

17. The equipment support apparatus of claim 15 further comprising a handle attached to the mounting stage.

18. The equipment support apparatus of claim 17 wherein the handle is pivotally and rotatably connected to the mounting stage.

19. The equipment support apparatus of claim 1 wherein the folding axis and the balancing axis are substantially perpendicular to one another.

20. A method of balancing and folding the equipment support apparatus of claim 1, the method comprising:

balancing the equipment support system by pivotally adjusting at least one of the upper spar and lower spar about the balancing axis; and folding the upper hinge section and lower hinge section toward one another about the folding axis;

wherein when the equipment support system is unfolded the equipment support system balance is maintained.

* * * * *

UNITED STATES PATENT AND TRADEMARK OFFICE
CERTIFICATE OF CORRECTION

PATENT NO. : 7,625,090 B2
APPLICATION NO. : 11/403500
DATED : December 1, 2009
INVENTOR(S) : Brown et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 862 days.

Signed and Sealed this

Twenty-first Day of December, 2010

David J. Kappos
*Director of the United States Patent and Trademark Office*